United States Patent
Mehedi et al.

(10) Patent No.: US 11,308,180 B1
(45) Date of Patent: Apr. 19, 2022

(54) FRACTIONAL ORDER DYNAMIC INVERSION CONTROLLER FOR NON-LINEAR SYSTEMS

(71) Applicant: King Abdulaziz University, Jeddah (SA)

(72) Inventors: Ibrahim M. Mehedi, Jeddah (SA); Ubaid M. Al-Saggaf, Jeddah (SA); Md. Sarowar Alam, Jeddah (SA); Mohd Heidir bin Mohd Shah, Jeddah (SA); Md. Masud Rana, Rajshahi (BD)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/498,354

(22) Filed: Oct. 11, 2021

(51) Int. Cl.
*G06F 17/13* (2006.01)

(52) U.S. Cl.
CPC .................................. *G06F 17/13* (2013.01)

(58) Field of Classification Search
CPC ...................................................... G06F 17/13
See application file for complete search history.

(56) References Cited

U.S. PATENT DOCUMENTS

| | | | |
|---|---|---|---|
| 6,856,111 | B2 | 2/2005 | Thomas et al. |
| 9,923,503 | B2 | 3/2018 | Malek et al. |
| 2019/0069110 | A1 | 2/2019 | Gorzel et al. |
| 2020/0183644 | A1 | 6/2020 | Risberg et al. |

FOREIGN PATENT DOCUMENTS

CN  108909524 A1  11/2018

OTHER PUBLICATIONS

Li, Z. "Fractional Order Modeling and Control of Multi-Input-Multi-Output Processes" [Thesis] University of California, Merced, Electrical Engineering [retrieved on Dec. 2, 2021] (Year: 2015).*

(Continued)

*Primary Examiner* — Rehana Perveen
*Assistant Examiner* — Alfred H B Wechselberger
(74) *Attorney, Agent, or Firm* — Oblon, McClelland, Maier & Neustadt, L.L.P.

(57) ABSTRACT

A device, method, and non-transitory computer readable medium for fractional order dynamic inversion control of nonlinear systems under the influence of a disturbance. The method for fractional order dynamic inversion control includes receiving a mathematical model of a controlled device, the mathematical model including a set of movement trajectories, wherein the movement trajectories include control objectives, formulating a first set of linear, time-varying, fractional order differential equations from the mathematical model, the first set including dynamic constraints on the control objectives, transforming the first set into linear equations by differentiating a norm measure function along the movement trajectories, thus generating a second set of fractional order differential equations, and determining a control signal for controlling the movement trajectories in the presence of disturbances by dynamically inverting the second set of fractional order differential equations.

19 Claims, 13 Drawing Sheets

(56) References Cited

OTHER PUBLICATIONS

Betancourt et al. "Stabilization and Tracking Control Algorithms for VTOL Aircraft: Theoretical and Practical Overview" Journal of Intelligent & Robotic Systems (Published Sep. 2020) vol. 100, pp. 1249-1263 [retrieved on Dec. 1, 2021] (Year: 2020).*

Oustaloup et al. "The CRONE toolbox for Matlab" Proceedings of the 2000 IEEE International Symposium on Computer-Aided Control System Design Anchorage, Alaska, USA [retrieved on Dec. 1, 2021] (Year: 2000).*

Tran et al. "Nonlinear Extended State Observer Based on Output Feedback Control for a Manipulator With Time-Varying Output Constraints and External Disturbance" IEEE Access vol. 7: p. 156860-156870 [retrieved on Dec. 3, 2021] (Year: 2019).*

Ullah et al. "Adaptive fuzzy fractional-order sliding mode controller for a class of dynamical systems with uncertainty" Transactions of the Institute of Measurement and Control 2016, vol. 38, No. 4, pp. 402-413; DOI: 10.1177/0142331215587042 [retrieved on Dec. 3, 2021] (Year: 2016).*

Dumlu, A. "Design of a fractional-order adaptive integral sliding mode controller for the trajectory tracking control of robot manipulators" Proc IMechE Part I: J Systems and Control Engineering 2018, vol. 232, No. 9, pp. 1212-1229; DOI: 10.1177/0959651818778218 [retrieved on Dec. 3, 2021] (Year: 2018).*

Ghasemi et al. "Sliding mode based fractional-order iterative learning control for a nonlinear robot manipulator with bounded disturbance" Transactions of the Institute of Measurement and Control 2018, vol. 40, No. 1, pp. 49-60; DOI: 10.1177/0142331216659130 [retrieved on Dec. 3, 2021] (Year: 2018).*

Dadras et al. "Fractional terminal sliding mode control design for a class of dynamical systems with uncertainty" Commun Nonlinear Sci Numer Simulat vol. 17, pp. 367-377 [retrieved on Dec. 8, 2021] (Year: 2012).*

Ramakrishnan et al. "Design of State Feedback LQR Based Dual Mode Fractional-Order PID Controller using Inertia Weighted PSO Algorithm: For Control of an Underactuated System" J. Inst. Eng. India Ser. C (Published Oct. 5, 2021) vol. 102, No. 6, pp. 1403-1417 [retrieved Dec. 8, 2021] (Year: 2021).*

Alegaria-Zamudio et al. "Fault tolerant system based on non-integers order observers: Application in a heat exchanger" ISA Transactions vol. 80 (2018), pp. 286-296 [retrieved on Dec. 9, 2021] (Year: 2018).*

Haidong, et al. ; Application of Fractional-order Calculus in Sliding Mode Control for Hypersonic Vehicles ; Proceedings of the $35^{th}$ Chinese Control Conference Jul. 27-29, 2016 ; 5 Pages.

Qin, et al. ; Design of Dynamic Inverse Fractional-order PID Controller for High Speed Aircraft; Association for Computing Machinery ; Nov. 2019 ; 5 Pages.

BAJODAH ; Generalised dynamic inversion spacecraft control design methodologies ; IET Control Theory and Application ; Feb. 3, 2008 ; 13 Pages.

Ansari, et al. ; 2934. Positional control of rotary servo cart system using generalized dynamic inversion ; Journal of Vibroengineering. Sep. 2018, vol. 20, Issue 6 ; 11 Pages.

* cited by examiner

FRACTIONAL ORDER DYNAMIC INVERSION CONTROLLER FOR NON-LINEAR SYSTEMS

BACKGROUND

Technical Field

The present disclosure is directed to fractional order dynamic inversion control of nonlinear systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Non-linear control techniques are used extensively in control systems, where non-linearity plays an important role both in a controlled process (plants) and in control methods. In real-life applications, most processes and plants are non-linear in nature. One known technique used to control a non-linear system is dynamic inversion (DI). DI is a structured way of nullifying dynamics so that a plant can be controlled as a linear system. DI has been widely applied in flight control system since a few decades. One limitation of the DI is that a dynamic model of a system is required to be known accurately. To overcome this limitation, incremental non-linear dynamic inversion (INDI) is conventionally used. INDI involves calculating an increment of a control input for every sample time based on system states one time step ahead, instead of computing a total control input directly.

Each of the aforementioned DI and INDI suffers from one or more drawbacks such as cancellation of useful non-linearities, a large control effort, robustness concerns, and computational challenges arising with square matrix inversion, hindering their adoption. Accordingly, it is one object of the present disclosure to provide methods and systems for fractional order dynamic inversion control for non-linear systems which cancels non-linearities and is simpler computationally.

SUMMARY

In an exemplary embodiment, a method for fractional order dynamic inversion control includes receiving a mathematical model of a controlled device, the mathematical model including a set of movement trajectories, wherein the movement trajectories include control objectives, formulating a first set of linear, time-varying, fractional order differential equations from the mathematical model, the first set including dynamic constraints on the control objectives, transforming the first set into linear equations by differentiating a norm measure function along the movement trajectories, thus generating a second set of fractional order differential equations, and determining a control signal for controlling the movement trajectories in the presence of disturbances by dynamically inverting the second set of fractional order differential equations.

In another exemplary embodiment, a system for fractional order dynamic inversion control of a controlled device includes: a controlled device configured to move along a set of movement trajectories based on control objectives, a motor configured to generate a force which moves the controlled device along the movement trajectories, a computing device connected to the motor, the computing device having circuitry and program instructions, which when executed by at least one processor, are configured to: receive a mathematical model of the controlled device, the mathematical model including the set of movement trajectories, wherein the set of movement trajectories include the control objectives, formulate a first set of linear, time-varying, fractional order differential equations from the mathematical model, the first set including dynamic constraints on the control objectives, and transform the first set into linear equations by differentiating a norm measure function along the movement trajectories, thus generating a second set of fractional order differential equations, determine a control signal for controlling the movement trajectories in the presence of disturbances by dynamically inverting the second set of fractional order differential equations.

In another exemplary embodiment, a non-transitory computer readable medium having instructions stored therein that, when executed by one or more processors, cause the one or more processors to perform a method for fractional order dynamic inversion control including receiving a mathematical model of a controlled device, the mathematical model including a set of movement trajectories, wherein the movement trajectories include control objectives, formulating a first set of linear, time-varying, fractional order differential equations from the mathematical model, the first set including dynamic constraints on the control objectives, transforming the first set into linear equations by differentiating a norm measure function along the movement trajectories, thus generating a second set of fractional order differential equations, determining a control signal for controlling the movement trajectories in the presence of disturbances by dynamically inverting the second set of fractional order differential equations.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
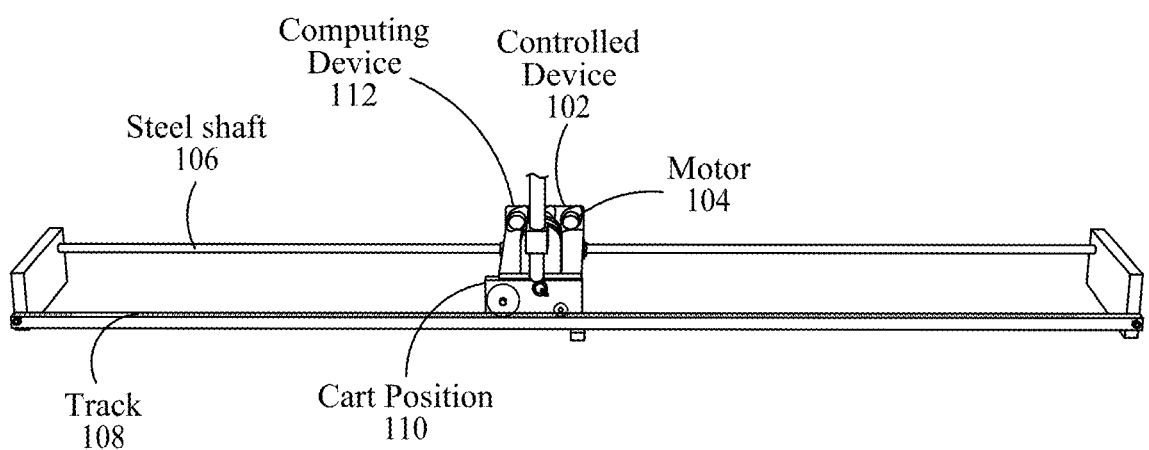
FIG. 1 is a schematic diagram of a linear servo car system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method for fractional order dynamic inversion control and a system for fractional order dynamic inversion control of a controlled device that uses fractional order calculus with dynamic inversion techniques. This is referred to as fractional order dynamic inversion (FODI) control. The FODI control method is based on an integer-order feedback linearization technique structured to cancel dynamics and control a system as a linear system. Dynamic constraints of the system are prescribed in the form of a fractional order differential equation that encapsulates control objectives. The fractional order differential equation is then transformed into a linear relation in a control vector by differentiating a norm measure function along the trajectories defined by the solution of the system's mathematical model. A control law is derived by inverting the relations using Moore-Penrose generalized inverse (MPGI) method. The control method as described in the disclosure outperforms the conventional integer order generalized dynamic inversion (GDI) control method in terms of set-point tracking, robustness, and the ability to adapt to the changes in the system's dynamics. Experiments in performing numerical simulations on a linear servo cart model shows that FODI controls the servo cart movements with smaller overshoot and with a smaller set-point tracking error.

Aspects of the present disclosure provide an FODI of a controlled device. The controlled device 102 may be a linear servo cart device as illustrated in FIG. 1. The controlled device 102 is actuated by a motor 104 to move along movement trajectories provided by a steel shaft 106 dynamically constrained to a track 108. The motor 102 is controlled by a computing device 112 that performs fractional order dynamic inversion control of the controlled device 102. The computing device 112 receives a mathematical model of a device to be controlled (hereinafter controlled device) by using fractional order differential equations. The mathematical model includes a set of movement trajectories. The mathematical model is given by:

$$\dot{x}(t) = f(x) + g(x)u; \quad (1)$$

$$y(t) = h(x); \quad (2)$$

where $x(t) \in \mathbb{R}^n$ is a position vector of the linear servo cart, and $y(t) \in \mathbb{R}^p$ is a output vector, while $u(t) \in \mathbb{R}^m$ is a control input vector, $f(x)$ is a motor force, $g(x)$ is a frictional force, and $h$ is a state vector.

The GDI control method introduces a constraint differential equation that includes control objectives, which is inverted using a Moore-Penrose generalized inverse (MPGI). Using the GDI control method overcomes limitations of DI techniques that include cancellation of useful non-linearities simplifying assumptions required to invert the nonlinear plant dynamics, large control effort, and square dimensionality restrictions. The difference between the FODI of the present disclosure and GDI is that a fractional order differential operator is used instead of the integer-order operator, as shown below in equation (3) and equation (4). The computing device 112 may model a first set of linear, time-varying, fractional order differential equations from the mathematical model. The first set includes dynamic constraints on the control objectives. The first set of linear, time-varying, fractional order differential equations may be modeled based on:

$$\frac{d^\alpha}{dt^\alpha}\xi + c(t)\xi = 0, \quad (3)$$

where $0 < \alpha \le 1$, $c(t)$ is a constraint at time t, and $\xi$ is an error function which represents squared error norms of state deviation functions, $$\frac{d^\alpha \xi}{dt^\alpha} = 2ne\left(F(x) + G(x)u - \frac{d^\alpha}{dt^\alpha}y_{meas}\right). \quad (4)$$

where, e is an error in a position of the controlled device, $F(x)$ is a force applied to move the controlled device along the movement trajectories, $G(x)$ is a frictional force, and $y_{meas}$ is a measured output vector. Therefore, by following the GDI design procedure, the control signal is obtained as follows:

$$u_c = G^+\left(F(x) + c(t)e - \frac{d^\alpha}{dt^\alpha}y_{meas}\right), \quad (5)$$

where, $u_c$ represents the dynamic constraints on the control objectives of the cart, and $G^+$ is the real part of the frictional force.

To obtain the value of $\alpha$, the system is simulated with value of $\alpha$ ranging from 0.1 to 0.9 with a step size of 0.1. The value of $\alpha$ is selected which gives the lowest tracking error.

As explained above, the present disclosure describes designing a controller by obtaining the mathematical model of the device to be controlled. An example of controlling a position of a linear servo cart device by the controller and control methods of the present disclosure is illustrated in FIG. 1. By applying Newton's second law of motion and D'Alembert's principle, a relationship between the force applied to the cart device by a DC motor and resultant motion of the cart may be determined by equation (6). The first set of linear, time-varying, fractional order differential equations may be generated based on:

$$M\dot{v}_c(t) + F_{aj}(t) = F_c(t) - B_{eq}v_c(t), \quad (6)$$

where M, $v_c$, and $B_{eq}$ are the mass of the cart device, the linear velocity of the cart device, and the equivalent viscous damping coefficient, respectively. Also, in equation (6), $F_c(t)$ is the force applied to the cart, and $F_{aj}$ is the armature inertial force due to motor rotation acting on the cart which can be defined as:

$$F_{aj} = \frac{\eta_g K_g \tau_{aj}}{r_{mp}}, \quad (7)$$

where $\eta_g$ is an efficiency of a gearbox, $K_g$ is a gear ratio of the gear, $F_c(t)$ is the force applied to the cart, $r_{mp}$ is a radius of the motor pinion, and $\tau_{aj}$ is an armature inertial torque which can be expressed as:

$$\tau_{aj} = J_m \dot{\omega}_m(t). \quad (8)$$

The translation between an angular velocity of the motor shaft into a linear velocity of the cart device 102 is represented by the following equation:

$$v_c(t) = \frac{r_{mp} \omega_m(t)}{K_g}. \quad (9)$$

Equation (7) can be updated by substituting equations (8) and (9) into equation (7) as provided below:

$$F_{aj} = \frac{\eta_g K_g^2 J_m \dot{v}_c(t)}{r_{mp}^2}, \quad (10)$$

where $\omega_m(t)$ is angular momentum of a motor shaft of the motor, and $J_m$ is a constant which represents a moment of inertial of a rotor of the motor.

Considering both the electrical parts and the equation of motion, the force in equation (6) can now be expressed in terms of the linear velocity of the cart:

$$J_{eq} \dot{v}_c(t) + B_{eq} v_c(t) = A_m V_m(t), \quad (11)$$

where:

$$B_{eq} = \frac{\eta_g K_g^2 \eta_m K_t K_m + B_c r_{mp}^2 R_m}{r_{mp}^2 R_m}; \quad (12)$$

with an actuator gain:

$$A_m = \frac{\eta_g K_g \eta_m K_t}{r_{mp} R_m}; \quad (13)$$

where, $\eta_m$ is the efficiency of the motor, $K_g$, $K_t$, and $K_m$ are the gear ratio, motor torque constant, and back-emf constant, respectively, while $r_{mp}$ is the radius of the motor pinion, and $R_m$ is the motor resistance. An equivalent inertia term may be expressed by:

$$J_{eq} = M_c + \frac{\eta_{eq} K_g^2 J_m}{r_{mp}^2}; \quad (14)$$

Rearranging equation (11) yields the dynamic equation of linear servo cart device as follows:

$$\dot{v}_c = F + G V_m; \quad (15)$$

where $F = -J_{eq}^{-1} B_{eq} v_c$, and $G = J_{eq}^{-1} A_m$. A velocity of the cart device 102 can be obtained by taking a derivative of its linear position 110:

$$\dot{x}_c = v_c; \quad (16)$$

An objective of the control method is to track the linear position setpoint of the cart device 102 precisely. In order to track the track the linear position setpoint, an error function or a norm function in the form of squared error function for a position of the cart or an actual position, $x_c$ from its desired position, $x_{cd}$ is provided:

$$\xi_{x_c} = n_1 (x_c - x_{cd})^2 = n_1 e_{x_c}^2; \quad (17)$$

where $e_{x_c}^2(t)$ is an error in the position of the cart at time t, $n_1$ is a first positive real valued constant, $x_c(t)$ is an actual position of the cart at a time, t and $x_{cd}(t)$ is a desired position of the cart at the time t.

Similarly, the error function for linear velocity is defined as:

$$\xi_{v_c} = n_2 (v_c - v_{cd})^2 = n_2 e_{v_c}^2, \quad (18)$$

where $e_{v_c}^2$ is an error in the linear velocity at time t, $n_2$ is a second positive real valued constant, $v_c(t)$ is an actual linear velocity of the cart at a time t, $v_{cd}(t)$ is a desired linear velocity of the cart at the time t.

The first set into linear equations may be transformed by differentiating the norm measure function along the movement trajectories, thus generating a second set of fractional order differential equations. The norm measure function is simply a measurement of the position and speed of the cart, that is, a square of the distance between an origin and a point on the track 106, when the norm measure is in Euclidian space (n=2). It is essentially a measurement of the sums of distance the cart travels from point to point.

Based on the deviation functions, the linear time varying fractional order differential equations are given by:

$$\frac{d^\beta}{dt^\beta} \xi_{x_c} + C_1(t) \frac{d^\alpha}{dt^\alpha} \xi_{x_c} + C_2(t) \xi_{x_c} = 0; \quad (19)$$

$$\frac{d^\alpha}{dt^\alpha} \xi_{v_c} + C_3(t) \xi_{v_c} = 0; \quad (20)$$

where $C_1$, $C_2$, and $C_3$ are coefficients that are selected carefully so that the constraint fractional order differential equations in (19) and (20) achieve uniform asymptotic stability, $\alpha$ is a fractional order of a derivative $$\frac{d^\alpha}{dt^\alpha},$$

for $0 < \alpha \leq 1$ and $\beta$ is a fractional order of $$\frac{d^\beta}{dt^\beta},$$

for $0 < \beta \leq 1$, $\xi_{x_c}$ is an error function of the position of the cart, and $\xi_{v_c}$ is an error function of a linear velocity of the cart. $\alpha \in \mathbb{R}$ and $\beta \in \mathbb{R}$ and $\alpha$ and $\beta$ in the above equations denote the order of the derivative operators. Performing a derivation on equation (17) and (18) with respect to α yields the following:

$$\frac{d^\alpha}{dt^\alpha}\xi_{x_c} = 2n_1 e_{x_c}\left(\frac{d^\alpha}{dt^\alpha}e_{x_c}\right); \quad (21)$$

and $$\frac{d^\alpha}{dt^\alpha}\xi_{v_c} = 2n_2 e_{v_c}\left(\frac{d^\alpha}{dt^\alpha}e_{v_c}\right) + 2n_2 e_{v_c}(F + GV_m - \dot{v}_{cd}); \quad (22)$$

Further derivation of equation (21) with respect to β yields:

$$\frac{d^\beta}{dt^\beta} = 2n_1\left(\frac{d^\alpha}{dt^\alpha}e_{x_c}\right)^2 + 2n_1 e_{x_c}(F + GV_m - \dot{v}_{cd}); \quad (23)$$

Equations (21)-(23) are transformed into an algebraic form by placing the time derivatives of the equations in the constraint dynamics as in equations (19) and (20) as shown below:

$$AV_m = B; \quad (24)$$

where:

$$A = \begin{bmatrix} A_1 \\ A_2 \end{bmatrix} = \begin{bmatrix} 2n_1 e_{x_c} G \\ 2n_2 e_{v_c} G \end{bmatrix}; \quad (25)$$

and $$B = \begin{bmatrix} B_1 \\ B_2 \end{bmatrix} = \begin{bmatrix} 2n_1 e_{x_c}\dot{v}_{cd} - 2n_1\left(\frac{d^\alpha}{dt^\alpha}e_{x_c}\right)^2 - 2n_1 e_{x_c}F - 2c_1 n_1 e_{x_c}\left(\frac{d^\alpha}{dt^\alpha}e_{x_c}\right) - c_2 n_1 e_{x_c}^2 \\ 2n_2 e_{v_c}\dot{v}_{cd} - 2n_2 e_{v_c}F - c_3 n_2 e_{v_c}^2 \end{bmatrix}; \quad (26)$$

Due to the under-determined nature of the algebraic expression, equation (24) may have an infinite number of solutions. Therefore, a generalized inversion by a Greville method is considered. For an input matrix A, a generalized inversion by the Greville method is described below.

For a matrix A of n×m, the input n×m is broken down into row vectors $a_i$:

$$A = (a_1^T, a_2^T, \ldots, a_n^T)^T. \quad (A)$$

The i×n matrices $A_i$ is defined by:

$$A_1 = a_1; \; A_i = \begin{pmatrix} A_{i-1} \\ a_i \end{pmatrix}. \quad (B)$$

For i=1, 2, ..., n×I matrices $A_i^+$ as:

$$A_i^+ = (A_{i-1}^+ - b_i^T d_i b_i^T); \quad (C)$$

where $$d_i = a_i A_{i-1}^+, \; c_i = a_i - d_i A_{i-1}^+, \; b_i = \begin{cases} \dfrac{c_i}{c_i c_i^T} & (c_i \neq 0) \\ \dfrac{d_i(A_{i-1}^+)^T}{1 + d_i d_i^T} & (c_i = 0) \end{cases}, \text{ and}$$

$$A_i^+ = \begin{cases} \dfrac{a_1^T}{a_1 a_1^T} & (a_1 \neq 0) \\ a_1^T & (a_1 = 0) \end{cases}.$$

Using the generalized inversion by the Greville method, solutions in the equation (24) are parameterized as:

$$V_m = A^+ B + p\lambda; \quad (27)$$

where $A^+$ is inverted second set of fractional order differential equation obtained by applying a MPGI transformation of A which is given as:

$$A^+ = \frac{A^T}{A^T A}; \quad (28)$$

where λ is the null control, and p is the null projection given by:

$$p = 1 - A^+ A; \quad (29)$$

The main challenge associated with inversion techniques is the singularity which is caused by a discontinuity in the MPGI matrix function, and that eventually leads to the elements becoming unbounded. This happens when the inverted matrix tends to change its rank. To overcome this challenge, a dynamic scaling factor is augmented within MPGI. The scaling factor is denoted as u and can be defined as:

$$\dot{u}(t) = -u(t) + \frac{\gamma}{\|e_{x_c}(t)\|^2 + \|e_{v_c}(t)\|^2}, \; u(0) > 0; \quad (30)$$

A homogeneous part of (30) is asymptotically stable, whereas y in a forcing term is a positive real-valued constant. The dynamically scaled inverse (DSGI) is provided by:

$$A^* = \frac{A^T}{(A^T A + u(t))}; \quad (31)$$

Thus, the GDI based control input voltage may be updated by following expression:

$$V_m^* = A^* B; \quad (32)$$

The dynamic equation in (15) may be updated as:

$$\dot{v}_c = F + G(A^* B); \quad (33)$$

To evaluate performances of the disclosed control method, numerical simulations are performed on the linear servo cart model having parameters as in Table 1.

TABLE 1

Parameters of Linear Servo Cart System

| Parameters | Values | Units |
|---|---|---|
| Motor armature resistance, $R_m$ | 2.6 | Ω |
| Rotor moment of inertia, $J_m$ | $3.9 \times 10^{-7}$ | $Kgm^2$ |
| Motor current torque constant, $k_t$ | $7.7 \times 10^{-3}$ | Nm/A |
| Motor efficiency, $\eta_m$ | 1 | — |
| Motor back emf constant, $k_m$ | $7.7 \times 10^{-3}$ | V/(rad/s) |
| Gear ratio, $k_g$ | 3.71 | — |
| Gear efficiency, $\eta_g$ | 1 | — |
| Mass of the cart, M | 0.57 | kg |
| Motor pinion radius, $r_{mp}$ | 6.4 | mm |
| Equivalent viscous damping coefficient, $B_{eq}$ | 4.3 | — |

Simulations are performed in which a desired motion profile is set to move the cart device 102 by 100 mm from its initial position with acceleration time of 0.5 s. Then, the control is simulated with a derivative order, α, as in equation (26), which is set at different values ranging from 0.5 to 1.5.

Figure 2:
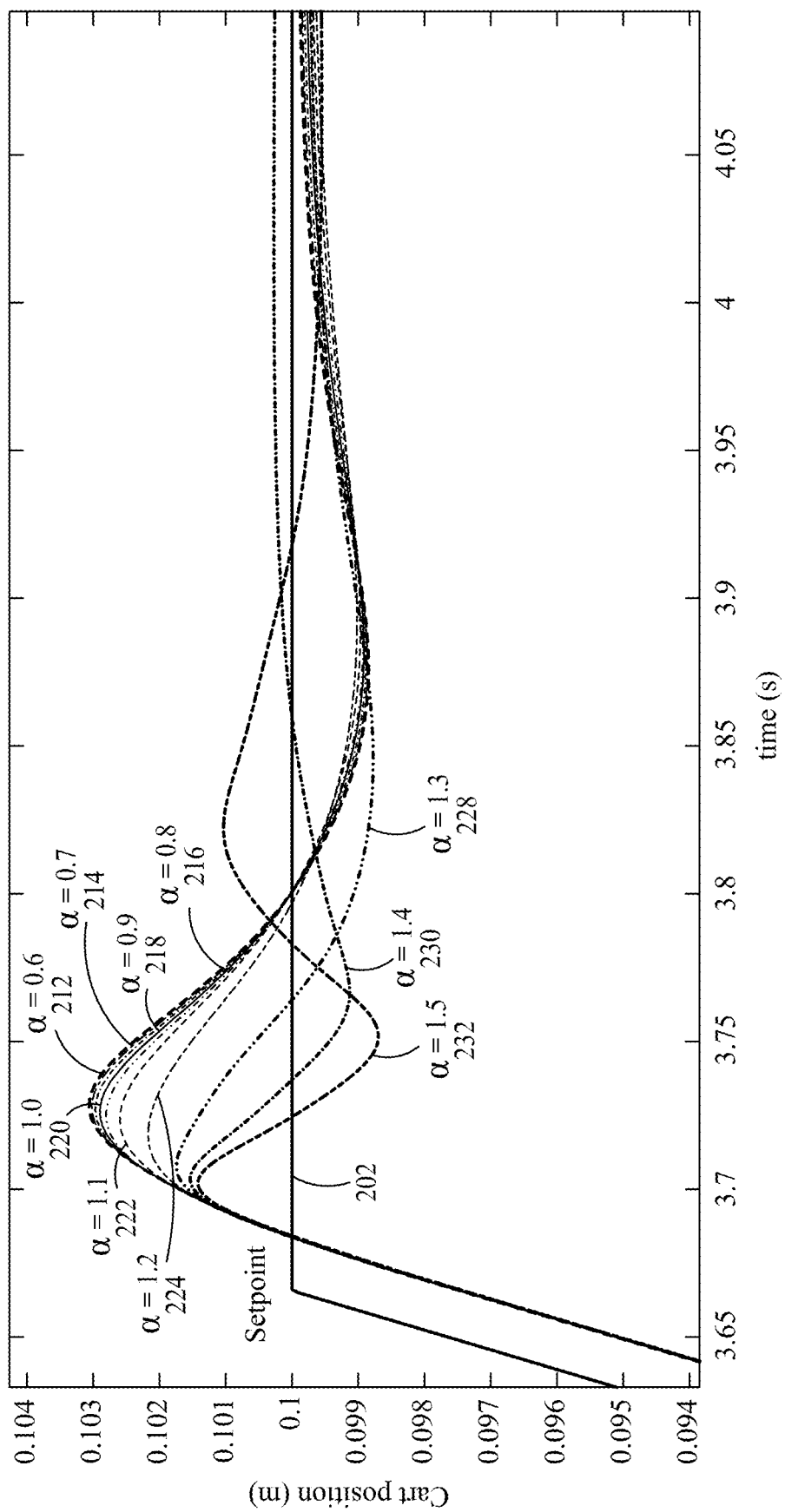
FIG. 2 is a plot illustrating performance of a fractional order dynamic inversion (FODI) system, according to certain embodiments.

FIG. 2 is a plot illustrating performance of fractional order dynamic inversion (FODI) control versus time. FIG. 2 illustrates step position tracking of the linear servo cart device, wherein the control method is simulated with the derivative order, α=0.6 (denoted by 212), α=0.7 (denoted by 214), α=0.8 (denoted by 216), α=0.9 (denoted by 218), α=1.0 (denoted by 220), α=1.1 (denoted by 222), α=1.2 (denoted by 224), α=1.3 (denoted by 228), α=1.4 (denoted by 230), and α=1.5 (denoted by 232). Results as shown in FIG. 2 suggest that the FODI control method performs the best when a is set at 1.4 (denoted by 230).

Figure 3:
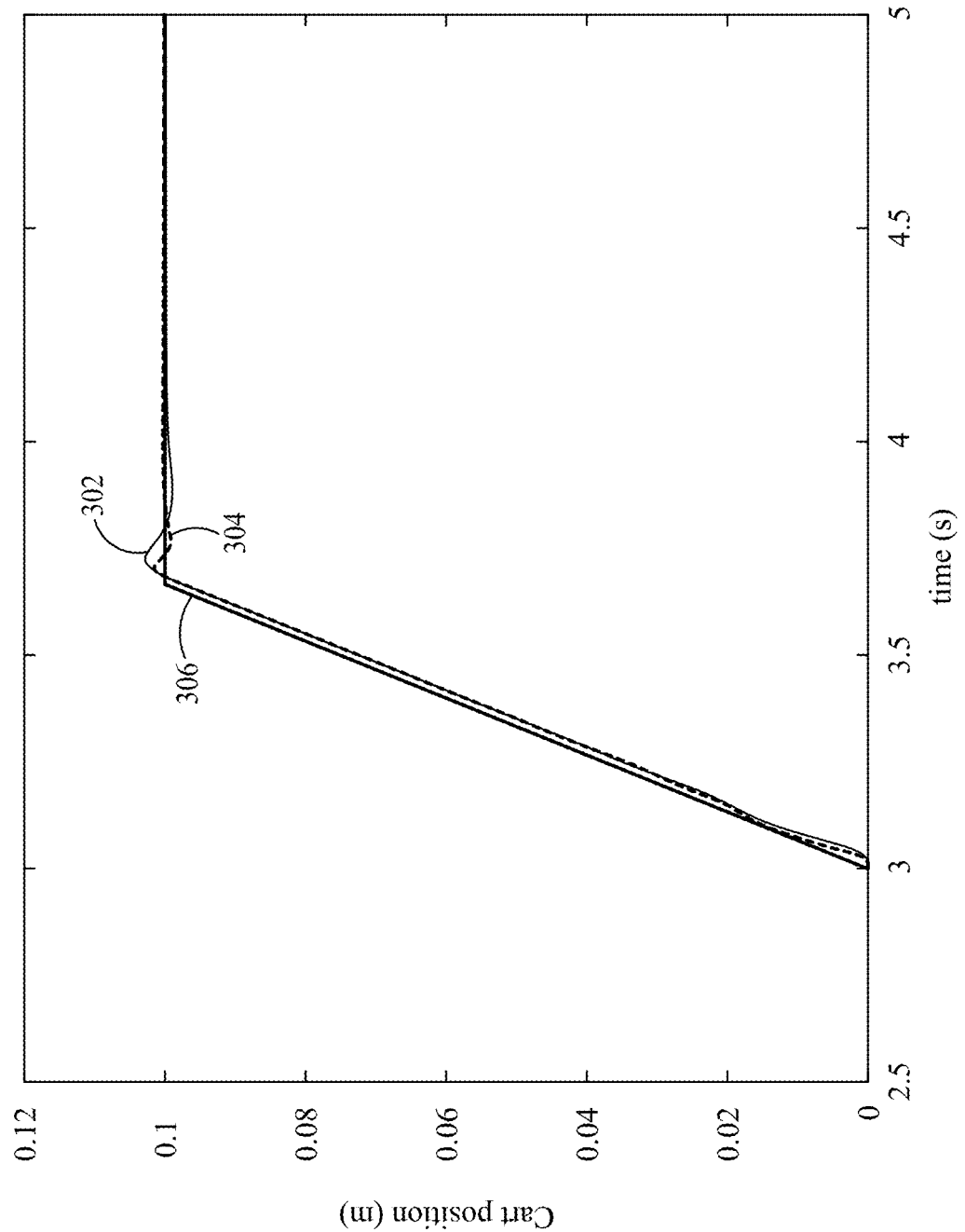
FIG. 3 is a plot illustrating a comparison of an integer order generalized dynamic inversion (GDI) system with the FODI system, according to certain embodiments.

A one to one comparison of the FODI method with integer-order GDI (α=1.0) (denoted by signal 302) versus time is shown in FIG. 3. FIG. 3 illustrates a GDI signal 302, a FODI signal 304 and a set point signal 306. FIG. 3 clearly indicates that, from observation of the FODI signal 304, the FODI method produces better results with smaller overshoot.

Figure 4:
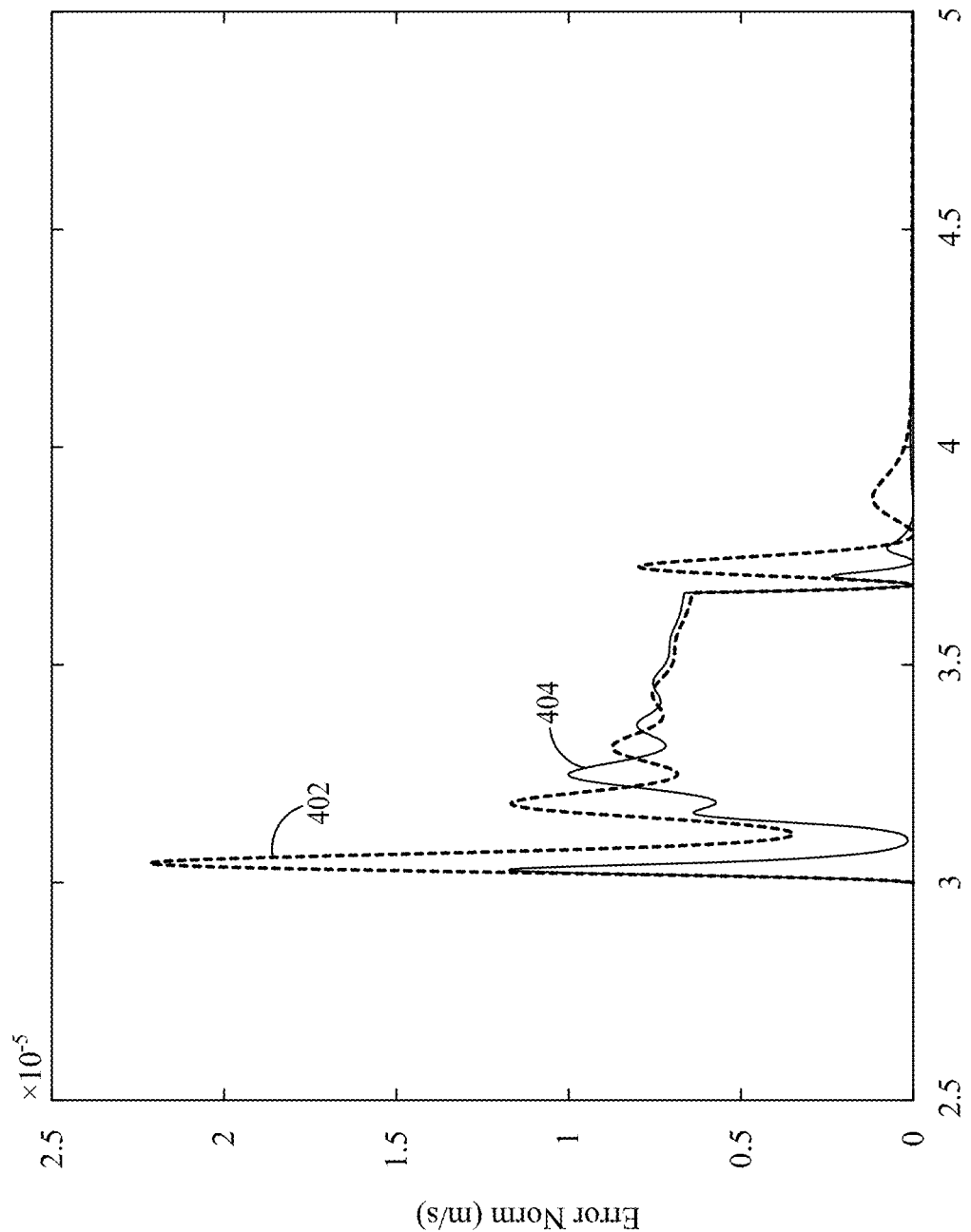
FIG. 4 is a plot illustrating an error norm for a step position tracking, according to certain embodiments.

FIG. 4 is a plot illustrating an error norm versus time for step position tracking with a GDI signal 402 and FODI signal 404. As illustrated in FIG. 4, the FODI signal 404 has a smaller set-point tracking error.

Figure 5:
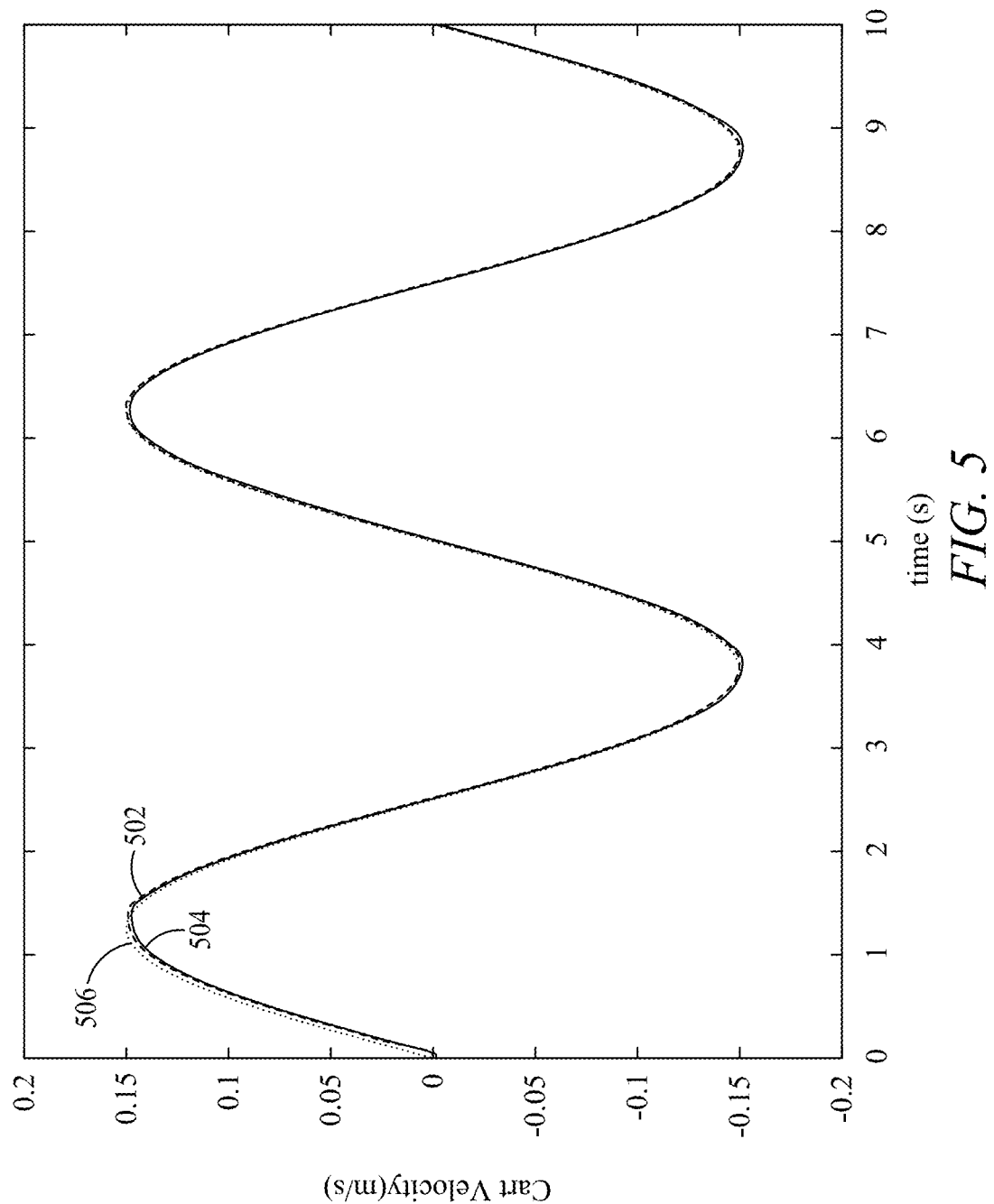
FIG. 5 is a plot illustrating a sinusoidal position tracking of linear servo cart device, according to certain embodiments.

Another comparison between the GDI method and the FODI method is performed with a sinusoidal wave input. In this scenario, however, an improvement made by introducing fractional order derivatives in GDI is not significant as shown in FIG. 5. FIG. 5 illustrates a FODI signal 502, a GDI signal 504, and a setpoint signal 506. As seen in FIG. 5, both the FODI signal 502 and the GDI signal 504, closely follow the setpoint signal.

Figure 6:
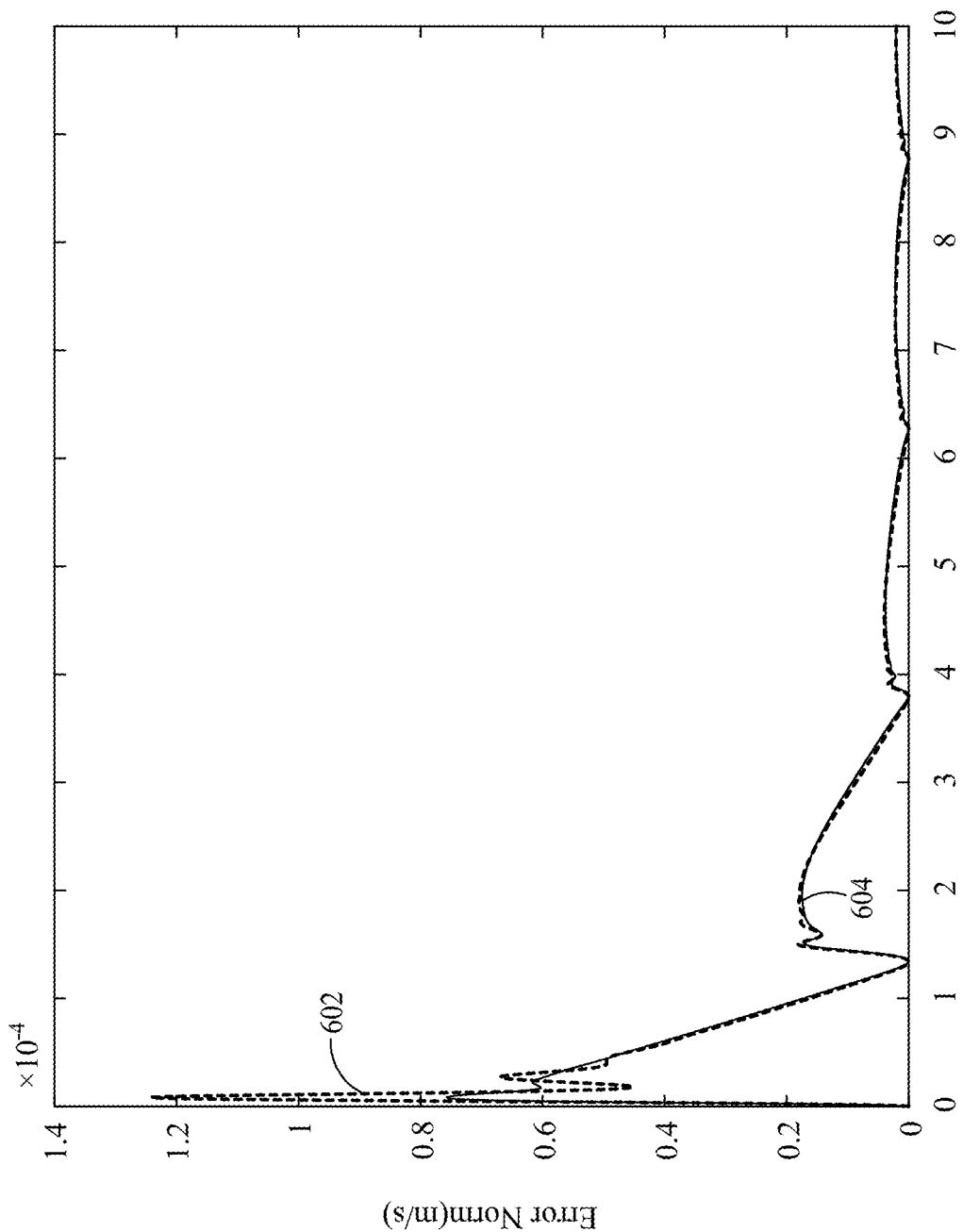
FIG. 6 is a plot illustrating an error norm for the sinusoidal position tracking of the linear servo cart device, according to certain embodiments.

FIG. 6 is a plot illustrating the error norm for the sinusoidal position tracking of the linear servo cart device versus time. FIG. 6 illustrates a GDI signal 602 and FODI signal 604. As seen, a small reduction in tracking error by FODI 604 is recorded especially at the beginning of the simulations.

Figure 7:
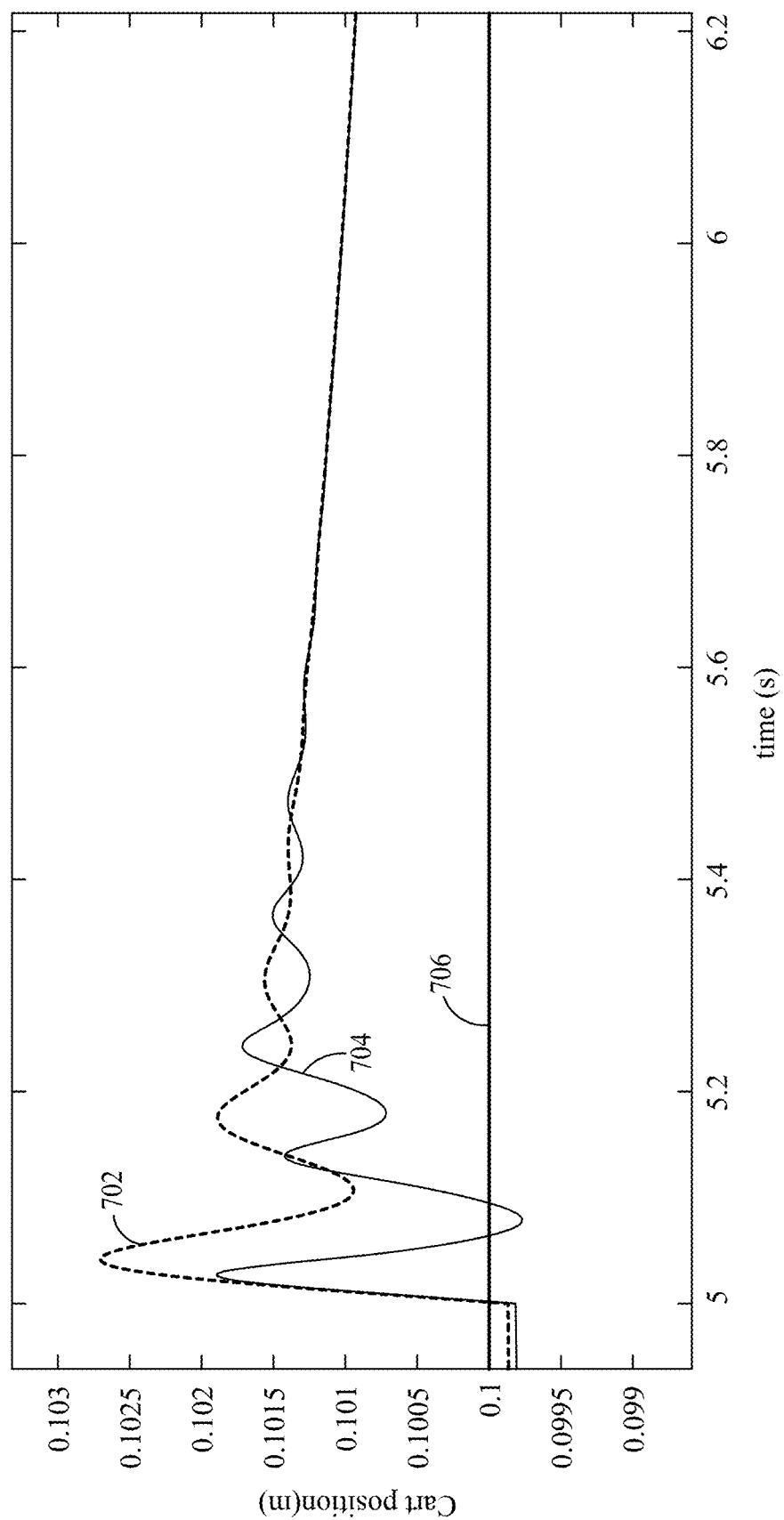
FIG. 7 is a plot illustrating a control method response in the presence of a disturbance, according to certain embodiments.

To test the control methods response on a disturbance, the disturbance is applied at time t=0.5 s and a cart position versus time plot is as shown in FIG. 7. FIG. 7 illustrates a GDI signal 702, a FODI signal 704, and a setpoint signal 706. FIG. 7 illustrates a result initially showing that both GDI control and FODI control started to deviate from the setpoint 706 in a positive direction when the disturbance is applied.

Figure 8:
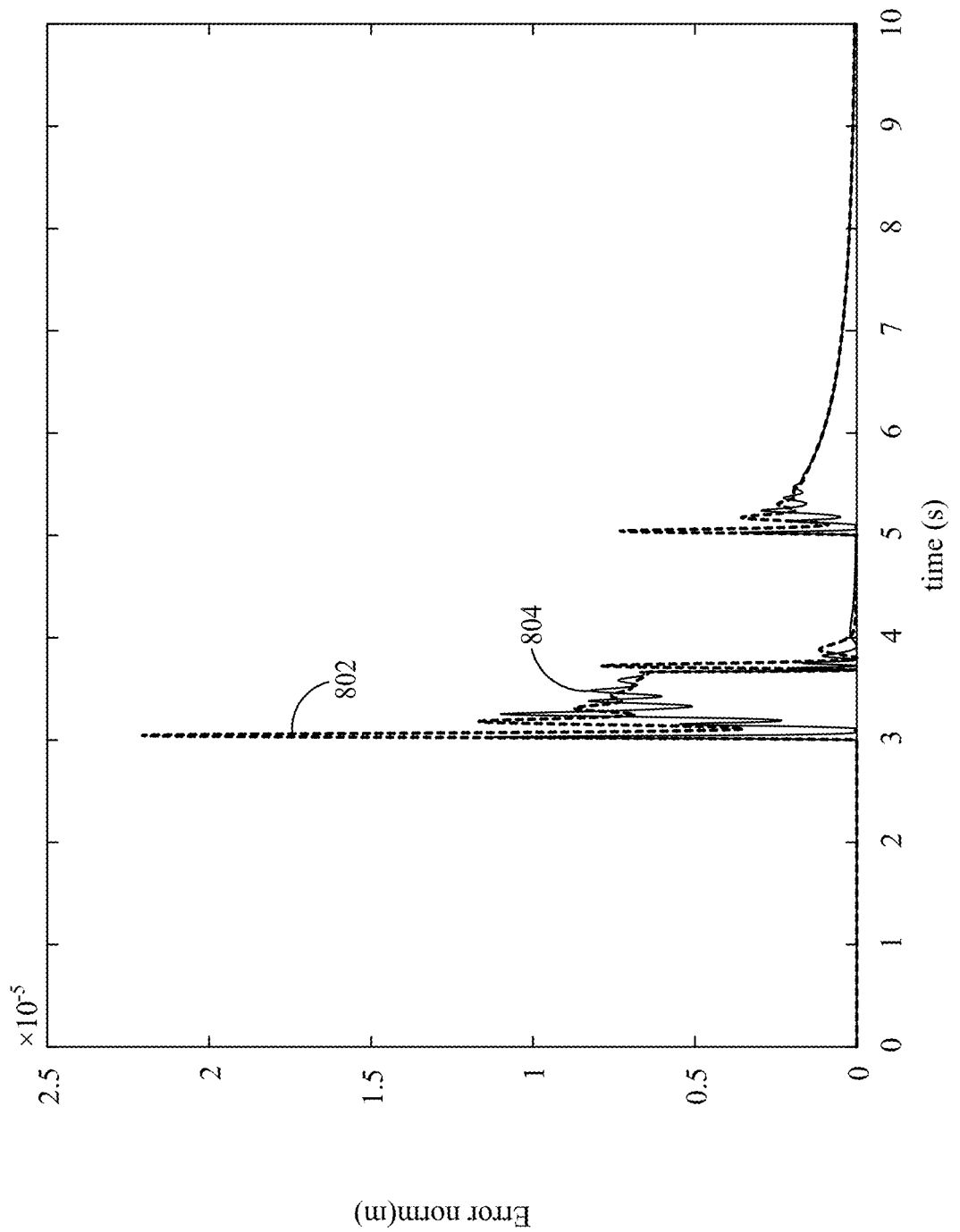
FIG. 8 is a plot illustrating an error norm of control method response in the presence of the disturbance, according to certain embodiments.

However, the GDI control appears to have deviated more severely compared to the FODI control as evident in the measured error norm illustrated in FIG. 8. FIG. 8 is a plot illustrating an error norm of the control response in the presence of the disturbance. As illustrated in FIG. 8, a signal associated with the FODI control 804 yields better performance as compared to the GDI control 802. Thus, FODI control performs better than GDI control in the presence of a disturbance.

As the FODI employs the MPGI technique of inversion similar to the GDI, it has the same advantages as the GDI as compared to the classical dynamic inversion technique. The FODI method overcomes some of drawbacks in classical dynamic inversion including the cancellation of useful nonlinearities, large control effort, robustness concerns and computational challenges arising with square matrix inversion. Other than that, as demonstrated in the results shown in FIG. 2-FIG. 8, FODI control performs better than GDI control in the sense of improved set-point tracking and the ability to perform under the presence of disturbances.

FODI control as described may be applied to an autonomous vehicle, where a distance of the vehicle travelled between a point A and point B is determined based on movement of the autonomous vehicle. Further, FODI control may be applied to determine and eliminate the disturbances while the autonomous vehicle is travelling. As described and demonstrated above using simulation, the FODI method demonstrates better performance than conventional control methods.

The first embodiment is illustrated with respect to FIGS. 1-13. The first embodiment describes a method for fractional order dynamic inversion control. The method for fractional order dynamic inversion control includes receiving a mathematical model of a controlled device, the mathematical model including a set of movement trajectories, wherein the movement trajectories include control objectives, formulating a first set of linear, time-varying, fractional order differential equations from the mathematical model, the first set including dynamic constraints on the control objectives, transforming the first set into linear equations by differentiating a norm measure function along the movement trajectories, thus generating a second set of fractional order differential equations, determining a control signal for controlling the movement trajectories in the presence of disturbances by dynamically inverting the second set of fractional order differential equations.

The method for fractional order dynamic inversion control further includes formulating the first set of linear, time-varying, fractional order differential equations based on:

$$\frac{d^\alpha}{dt^\alpha}\xi + c(t)\xi = 0,$$

where $0 < \alpha \leq 1$ and $$\frac{d^\alpha \xi}{dt^\alpha} = 2ne\left(F(x) + G(x)u - \frac{d^\alpha}{dt^\alpha}y_{meas}\right),$$

where ξ is an error function, c(t) is a constraint at time t, e is an error in a position of the controlled device, F(x) is a force applied to move the controlled device along the movement trajectories, G(x) is a frictional force, and $y_{meas}$ is an output vector; and wherein $u_c$ is the dynamic constraints on the control objectives of the cart given by:

$$u_c = G^+\left(F(x) + c(t)e - \frac{d^\alpha}{dt^\alpha}y_{meas}\right),$$

where $G^+$ is a real part of the frictional force.

The method for fractional order dynamic inversion control further includes inverting the second set of fractional order differential equations by applying a Moore-Penrose generalized inverse (MPGI) transformation.

The method for fractional order dynamic inversion control further includes applying a dynamic scaling factor to the MPGI transformation.

The method for fractional order dynamic inversion where the dynamic scaling factor, $\dot{u}(t)$, is given by:

$$\dot{u}(t) = -u(t) + \frac{\gamma}{\|e_{x_c}(t)\|^2 + \|e_{x_c}(t)\|^2}, \quad u(0) > 0.$$

The method for fractional order dynamic inversion where the controlled device is a linear servo cart which is actuated by a motor to move along movement trajectories dynamically constrained to a track, and the mathematical model is given by $\dot{x}(t)=F(x)+g(x)u$; $y(t)=h(x)$, where $x(t)$ is a position vector of the cart, $y(t)$ is an output vector, $g(x)$ is a frictional force, $u$ is a control input vector, and $F(x)$ is a motor force.

The method for fractional order dynamic inversion control further includes calculating an error function for a position of the cart based on $\xi_{x_c} = n_1 e_{x_c}^2(t)$, where $e_{x_c}^2(t) = (x_c - x_{cd})^2$, and where $e_{x_c}^2(t)$ is an error in the position of the cart at time t, $n_1$ is a __, $x_c(t)$ is an actual position of the cart at a time t and $x_{cd}(t)$ is a desired position of the cart at the time t.

The method for fractional order dynamic inversion control further includes calculating an error function for a linear velocity of the cart based on $\xi_{v_c} = n_2 e_{v_c}^2$, where $e_{v_c}^2 = (v_c - v_{cd})^2$, $e_{v_c}^2$ is an error in the linear velocity at time t, $n_1$ is the first real valued constant, $v_c(t)$ is an actual linear velocity of the cart at a time t, $v_{cd}(t)$ is a desired linear velocity of the cart at the time t and $n_2$ is the second real valued constant.

The method for fractional order dynamic inversion control further includes generating the first set of linear, time-varying, fractional order differential equations based on:

$$M\dot{v}_c(t) + F_{aj}(t) = F_c(t) - B_{eq}v_c(t),$$

where M is a mass of the cart, $v_c(t)$ is a linear velocity of the cart, $F_c(t)$ is the force applied to the cart and $B_{eq}$ is an equivalent viscous damping coefficient, wherein $F_{aj}$ is an armature inertial force due to motor rotation acting on the cart defined as:

$$F_{aj} = \frac{\eta_g K_g \tau_{aj}}{r_{mp}},$$

where $\eta_g$ is a gear box efficiency, $K_g$ is a gear ratio, $\tau_{aj}$ is an inertial torque of the armature, $r_{mp}$ is a radius of the motor pinion.

The method for fractional order dynamic inversion control where $\tau_{aj}$ is given by:

$$\tau_{aj} = J_m \dot{\omega}_m(t), \text{ and}$$

$v_c(t)$ is given by:

$$v_c(t) = \frac{r_{mp}\omega_m(t)}{K_g},$$

where $\omega_m(t)$ is an angular momentum of a motor shaft of the motor and $J_m$ is a constant which represents a moment of inertial of a rotor of the motor.

The method for fractional order dynamic inversion control further includes generating the second set of linear, time-varying, fractional order differential equations based on:

$$\frac{d^\beta}{dt^\beta}\xi_{x_c} + C_1(t)\frac{d^\alpha}{dt^\alpha}\xi_{x_c} + C_2(t)\xi_{x_c} = 0,$$

$$\frac{d^\alpha}{dt^\alpha}\xi_{v_c} + C_3(t)\xi_{v_c} = 0,$$

where $C_1$, $C_2$, and $C_3$ are coefficients; $\alpha$ is a fractional order of a derivative $$\frac{d^\alpha}{dt^\alpha},$$

for $0<\alpha\leq 1$ and $\beta$ is a fractional order of $$\frac{d^\beta}{dt^\beta},$$

for $0<\beta\leq 1$, $\xi_{x_c}$ is an error function of the position of the cart, and $\xi_{v_c}$ is an error function of a linear velocity of the cart.

The method for fractional order dynamic inversion control further includes selecting the $C_1$, $C_2$, and $C_3$ such that the second set achieves asymptotic stability.

The method for fractional order dynamic inversion control further includes inverting the second set of fractional order differential equations by applying a Moore-Penrose generalized inverse (MPGI) transformation.

The method for fractional order dynamic inversion control further includes applying a dynamic scaling factor to the MPGI transformation.

The method for fractional order dynamic inversion control where the dynamic scaling factor, $\dot{u}(t)$, is given by:

$$\dot{u}_c(t) = -u_c(t) + \frac{\gamma}{\|e_{x_c}(t)\|^2 + \|e_{v_c}(t)\|^2}, \quad u_c(0) > 0.$$

The second embodiment is illustrated with respect to FIGS. 1-13. The second embodiment includes a system for fractional order dynamic inversion control of a controlled device. The system for fractional order dynamic inversion control of a controlled device includes a controlled device 102 configured to move along a set of movement trajectories based on control objectives, a motor 104 configured to generate a force which moves the controlled device along the movement trajectories, a computing device 112 connected to the motor 106, the computing device 112 having circuitry and program instructions, which when executed by at least one processor, are configured to: receive a mathematical model of the controlled device, the mathematical model including the set of movement trajectories, wherein the set of movement trajectories include the control objectives, formulate a first set of linear, time-varying, fractional order differential equations from the mathematical model, the first set including dynamic constraints on the control objectives, transform the first set into linear equations by differentiating a norm measure function along the movement trajectories, thus generating a second set of fractional order differential equations, and determine a control signal for controlling the movement trajectories in the presence of disturbances by dynamically inverting the second set of fractional order differential equations.

The system for fractional order dynamic inversion control of the controlled device 102, where the computing device is further configured to formulate the first set of linear, time-varying, fractional order differential equations based on:

$$\frac{d^\alpha}{dt^\alpha}\xi + c(t)\xi = 0,$$

where $0 < \alpha \le 1$ and $$\frac{d^\alpha \xi}{dt^\alpha} = 2ne\left(F(x) + G(x)u - \frac{d^\alpha}{dt^\alpha}y_{meas}\right),$$

where $\xi$ is an error function, $c(t)$ is a constraint at time t, n is a real valued constant, e is an error in a position of the controlled device, $F(x)$ is a force applied to move the controlled device along the movement trajectories, $G(x)$ is a frictional force, and $y_{meas}$ is an output vector; and wherein $u_c$ is the dynamic constraints on the control objectives of the cart given by:

$$u_c = G^+\left(F(x) + c(t)e - \frac{d^\alpha}{dt^\alpha}y_{meas}\right),$$

where G+ is a real part of the frictional force, invert the second set of fractional order differential equations by applying a Moore-Penrose generalized inverse (MPGI) transformation; and apply a dynamic scaling factor to the MPGI transformation, wherein the dynamic scaling factor, $\dot{u}(t)$, is given by:

$$\dot{u}(t) = -u(t) + \frac{\gamma}{\|e_{x_c}(t)\|^2 + \|e_{\dot{x}_c}(t)\|^2}, u(0) > 0.$$

The system for fractional order dynamic inversion control of a controlled device, where the mathematical model is given by $\dot{x}(t) = F(x) + g(x)u$; $y(t) = h(x)$, where $x(t)$ is a position vector of the cart, $y(t)$ is an output vector, $g(x)$ is a frictional force, u is a control input vector, and $F(x)$ is a motor force. The computing device is further configured to: calculate an error function for a position of the cart based on $\xi_{x_c} = n_1 e_{x_c}^2$ (t), where $e_{x_c}^2(t) = (x_c - x_{cd})^2$, and where $e_{x_c}^2(t)$ is an error in the position of the cart at time t, $n_1$ is a first positive real valued constant, $x_c(t)$ is an actual position of the cart at a time t and $x_{cd}(t)$ is a desired position of the cart at the time t, calculate an error function for a linear velocity of the cart based on $\xi_{v_c} = n_2 e_{v_c}^2$, where $e_{v_c}^2 = (v_c - v_{cd})^2$, $e_{v_c}^2$ is an error in the linear velocity at time t, $n_2$ is a second real valued constant, $v_c(t)$ is an actual linear velocity of the cart at a time t, $v_{cd}(t)$ is a desired linear velocity of the cart at the time t. The first set of linear, time-varying, fractional order differential equations is generated based on:

$M\dot{v}_c(t) + F_{aj}(t) = F_c(t) - B_{eq}v_c(t)$, where M is a mass of the cart, $v_c(t)$ is a linear velocity of the cart, $F_c(t)$ is the force applied to the cart and $B_{eq}$ is an equivalent viscous damping coefficient, wherein $F_{aj}$ is an armature inertial force due to motor rotation acting on the cart defined as:

$$F_{aj} = \frac{\eta_g K_g \tau_{aj}}{r_{mp}},$$

where $\eta_g$ is a gear box efficiency, $K_g$ is a gear ratio, $\tau_{aj}$ is an inertial torque of the armature, $r_{mp}$ is a radius of the motor pinion; where:

$\tau_{aj}$ is given by:

$\tau_{aj} = J_m \dot{\omega}_m(t)$, and $v_c(t)$ is given by:

$$v_c(t) = \frac{r_{mp}\omega_m(t)}{K_g},$$

where $\omega_m(t)$ is an angular momentum of a motor shaft of the motor and $J_m$ is a constant which represents a moment of inertial of a rotor of the motor, generate the second set of linear, time-varying, fractional order differential equations based on:

$$\frac{d^\beta}{dt^\beta}\xi_{x_c} + C_1(t)\frac{d^\alpha}{dt^\alpha}\xi_{x_c} + C_2(t)\xi_{x_c} = 0,$$

$$\frac{d^\alpha}{dt^\alpha}\xi_{v_c} + C_3(t)\xi_{v_c} = 0,$$

where $C_1$, $C_2$, and $C_3$ are coefficients; $\alpha$ is a fractional order of a derivative $$\frac{d^\alpha}{dt^\alpha},$$

for $0 < \alpha \le 1$ and $\beta$ is a fractional order of $$\frac{d^\beta}{dt^\beta},$$

for $0 < \beta \le 1$, $\xi_{x_c}$ is an error function of the position of the cart, and $\xi_{v_c}$ is an error function of a linear velocity of the cart, select the $C_1$, $C_2$, and $C_3$ such that the second set achieves asymptotic stability, invert the second set of fractional order differential equations by applying a Moore-Penrose generalized inverse (MPGI) transformation and apply a dynamic scaling factor to the MPGI transformation, wherein the dynamic scaling factor, $\dot{u}(t)$, is given by:

$$\dot{u}(t) = -u(t) + \frac{\gamma}{\|e_{x_c}(t)\|^2 + \|e_{x_c}(t)\|^2}, u(0) > 0.$$

The third embodiment is illustrated with respect to FIGS. 1-22. The third embodiment describes a non-transitory computer readable medium having program instructions stored therein that, when executed by one or more processors, cause the one or more processors to perform a method for fractional order dynamic inversion control, including receiving a mathematical model of a controlled device, the mathematical model including a set of movement trajectories, wherein the movement trajectories include control objectives, formulating a first set of linear, time-varying, fractional order differential equations from the mathematical model, the first set including dynamic constraints on the control objectives, transforming the first set into linear equations by differentiating a norm measure function along the movement trajectories, thus generating a second set of fractional order differential equations, and determining a control signal for controlling the movement trajectories in the presence of disturbances by dynamically inverting the second set of fractional order differential equations.

The computer readable medium method further includes formulating the first set of linear, time-varying, fractional order differential equations based on:

$$\frac{d^\alpha}{dt^\alpha}\xi + c(t)\xi = 0,$$

where $0 < \alpha \leq 1$ and $$\frac{d^\alpha \xi}{dt^\alpha} = 2ne\left(F(x) + G(x)u - \frac{d^\alpha}{dt^\alpha} y_{meas}\right),$$

where $\xi$ is an error function, c(t) is a constraint at time t, n is a positive real valued constant, e is an error in a position of the controlled device, F(x) is a force applied to move the controlled device along the movement trajectories, G(x) is a frictional force, and $y_{meas}$ is an output vector, $u_c$ is the dynamic constraints on the control objectives of the cart given by:

$$u_c = G^+\left(F(x) + c(t)e - \frac{d^\alpha}{dt^\alpha} y_{meas}\right),$$

where $G^+$ is a real part of the frictional force, inverting the second set of fractional order differential equations by applying a Moore-Penrose generalized inverse (MPGI) transformation, and applying a dynamic scaling factor to the MPGI transformation, wherein the dynamic scaling factor, $\dot{u}(t)$, is given by:

$$\dot{u}_c(t) = -u_c(t) + \frac{\gamma}{\|e_{x_c}(t)\|^2 + \|e_{v_c}(t)\|^2}, u_c(0) > 0.$$

Figure 9:
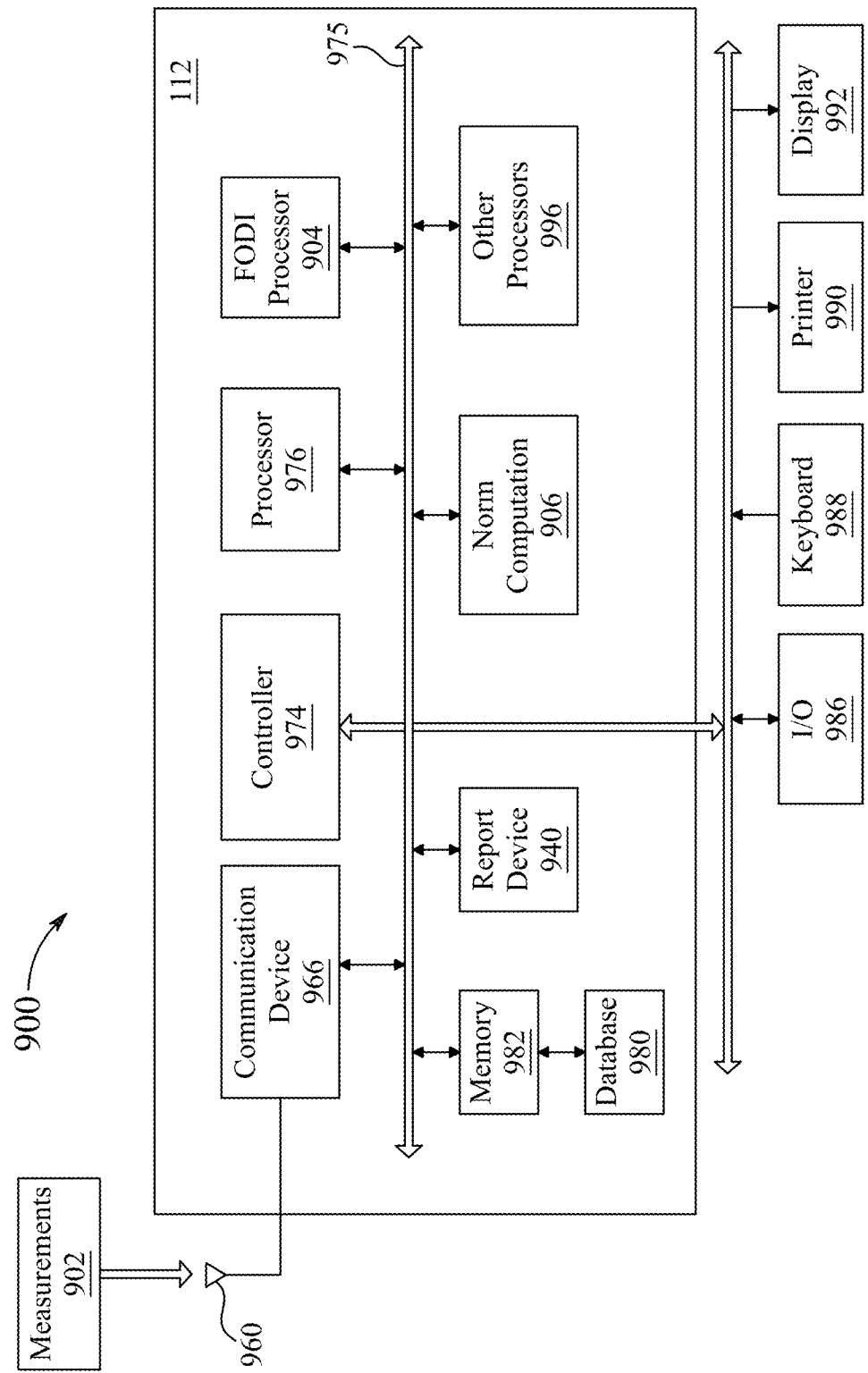
FIG. 9 illustrates a system for controlling a controlled device, according to aspects of the present disclosure

FIG. 9 illustrates a system 900 for controlling the linear servo cart controlled device 102 of FIG. 1. The system 900 includes the computing device 112 that performs the FODI. The computing device 112 is a special purpose device designed for performing the FODI. The computing device 112 includes a communication device 966 for receiving and communicating data with other devices. For example, the communication device 966 receives measurements 902 from the controlled device 102 at the antenna 960. The computing device 112 also includes controller 974, a general purpose processor 976, and a FODI processor 904. The FODI processor 904 performs an integer-order feedback linearization that is structured to cancel dynamics and control the system of FIG. 1 as a linear system. To perform the integer-order feedback linearization, the FODI processor 904 is configured to receive a mathematical model of the controlled device, formulate a first set of linear, time-varying, fractional order differential equations from the mathematical model, transform the first set into linear equations by differentiating a norm measure function along the movement trajectories, to generate a second set of fractional order differential equations, and determine a control signal for controlling the movement trajectories in the presence of disturbances by dynamically inverting the second set of fractional order differential equations. The computing device 922 also includes a memory 982, a database 980, and a norm processor 906, to support FODI method. The database 980 may store measurements, previous measurements of the controlled device 102, error logs due to any failures of the controlled device 102, measurement reports, and such information. The norm processor 906 may perform norm measurements as described above. The computing device 922 also includes an I/O 986, a keyboard 988, a printer 990, a display 992, and a communication bus 975. The computing device 922 may include program instructions which may be executed by one or more of the processor 976, the FODI processor 904, the norm computation 906, and other processors 996. A student or an operator of the system of FIG. 1 may use the keyboard and/or I/O device 986 to change speed of the motor 104, control movement of the controlled device 102, control the position of controlled device 112 and perform such operations. The student or the operator of the system of the system of FIG. 1 may input commands through the I/O device 986 to obtain measurement of a velocity of the controlled device 102, total distance travelled by the controlled device 102, obtain norm measurements, obtain plots associated with measurements, view the changes in the trajectory, etc., through the report device 940. The student or the operator may view the measurements, reports, changes in the trajectory, etc., on the display 992, and print the measurements or reports through the printer 990. Next, further details of the hardware description of the computing environment of FIG. 9 according to exemplary embodiments is described with reference to FIG. 10.

Figure 10:
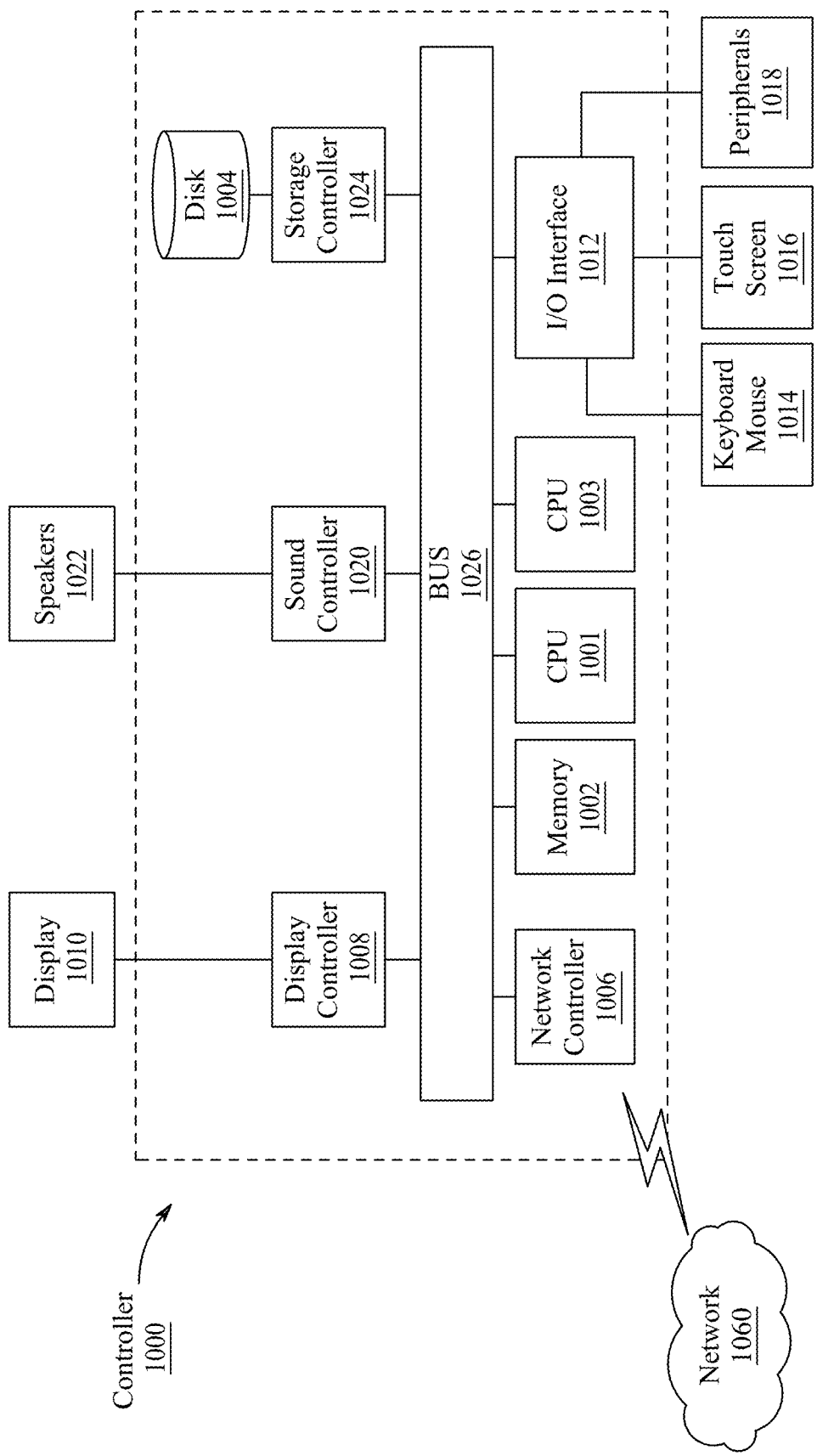
FIG. 10 is an illustration of a non-limiting example of details of computing hardware used in the computing device, according to certain embodiments.

In FIG. 10, a controller 1000 is described which is representative of the system 900 of FIG. 9 in which the computing device 112 includes a CPU 1001 which performs the processes described abovebelow. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 11:
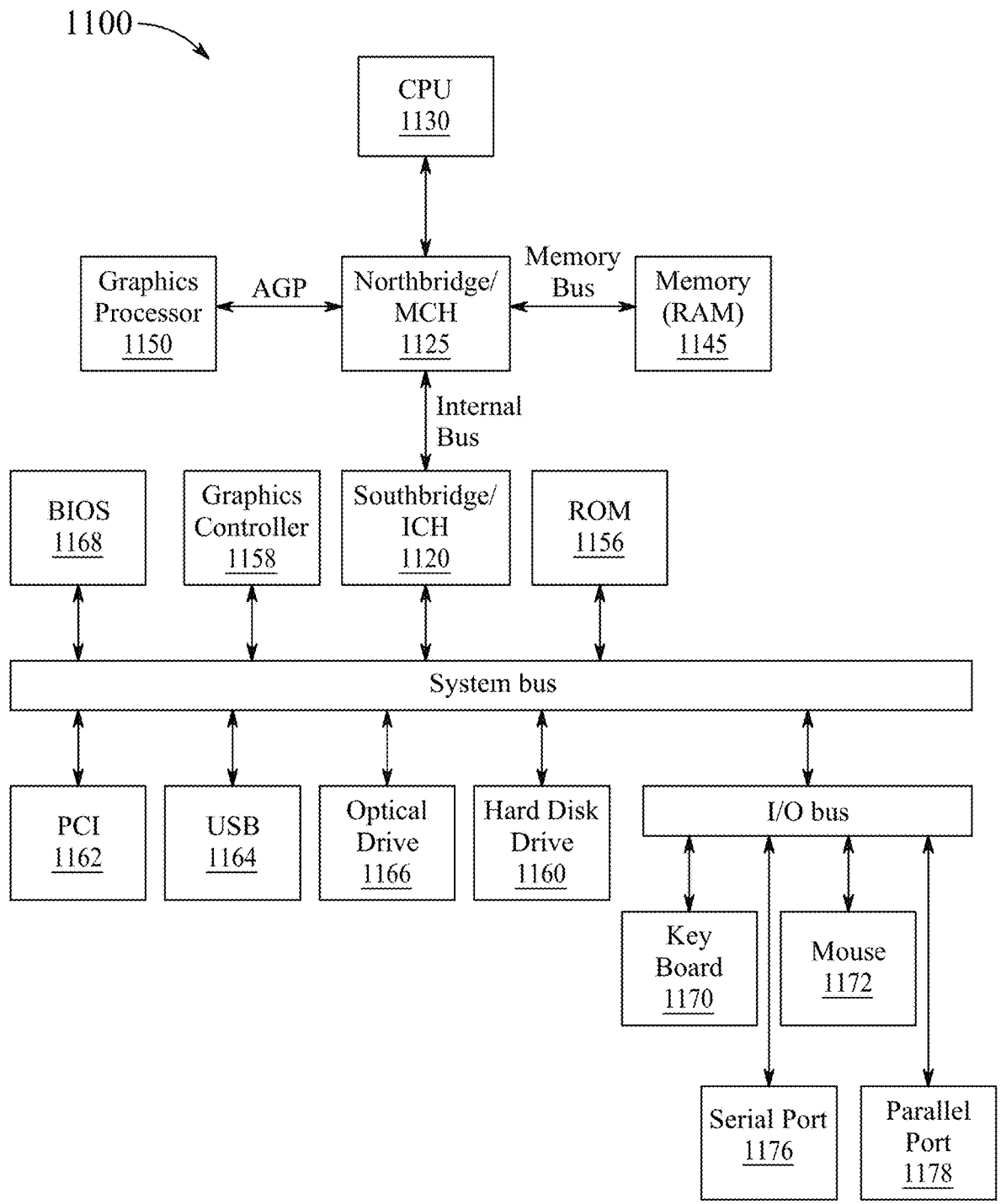
FIG. 11 is an exemplary schematic diagram of a data processing system used within the computing device, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
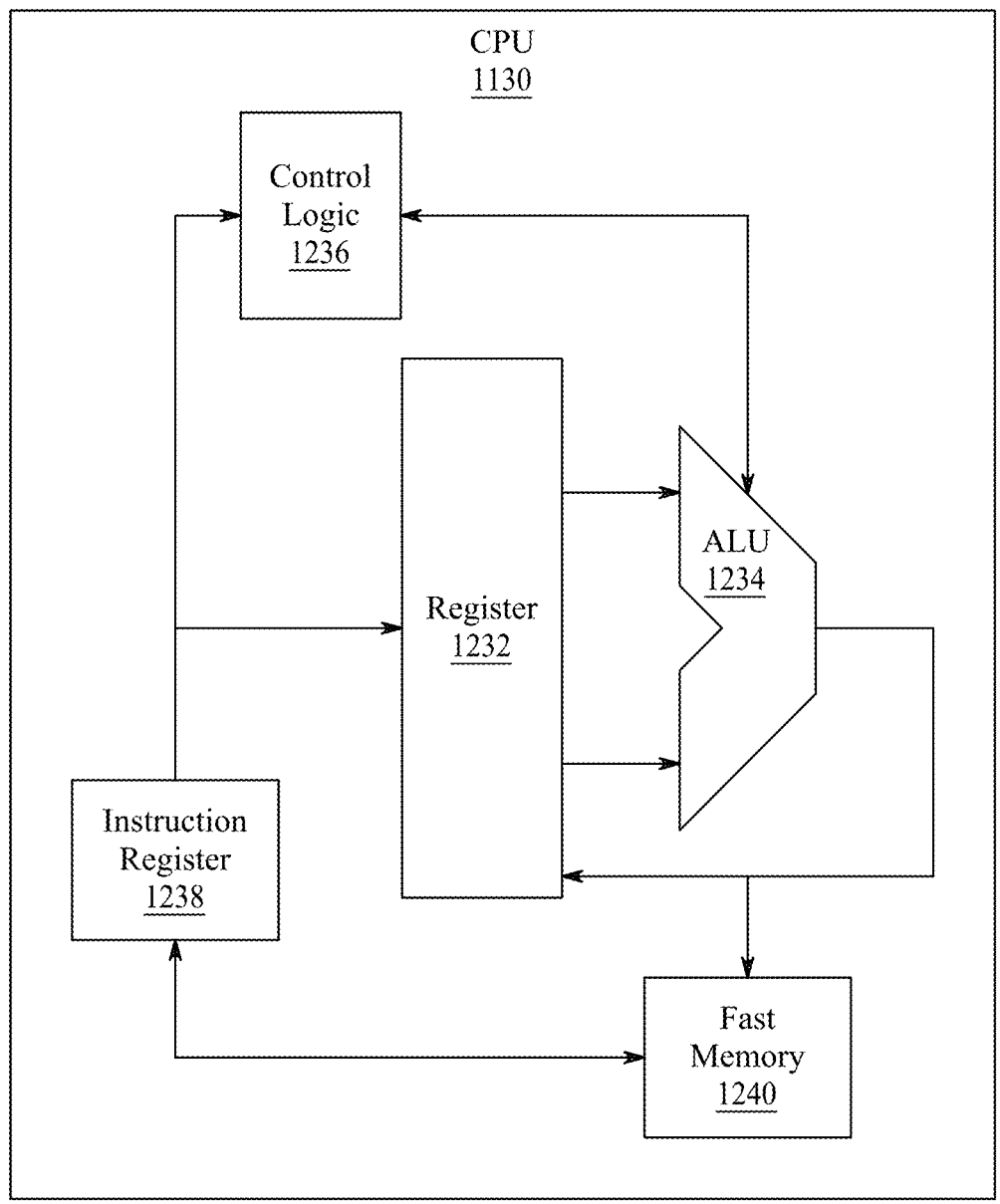
FIG. 12 is an exemplary schematic diagram of a processor used with the computing device, according to certain embodiments.

For example, FIG. 12 shows one implementation of CPU 1130. In one implementation, the instruction register 1238 retrieves instructions from the fast memory 1240. At least part of these instructions are fetched from the instruction register 1238 by the control logic 1236 and interpreted according to the instruction set architecture of the CPU 1130. Part of the instructions can also be directed to the register 1232. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1234 that loads values from the register 1132 and performs logical and mathematical operations on the loaded values according to the instructions. The results from these operations can be feedback into the register and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an IO Bus, a read only memory (ROM) 1156, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 13:
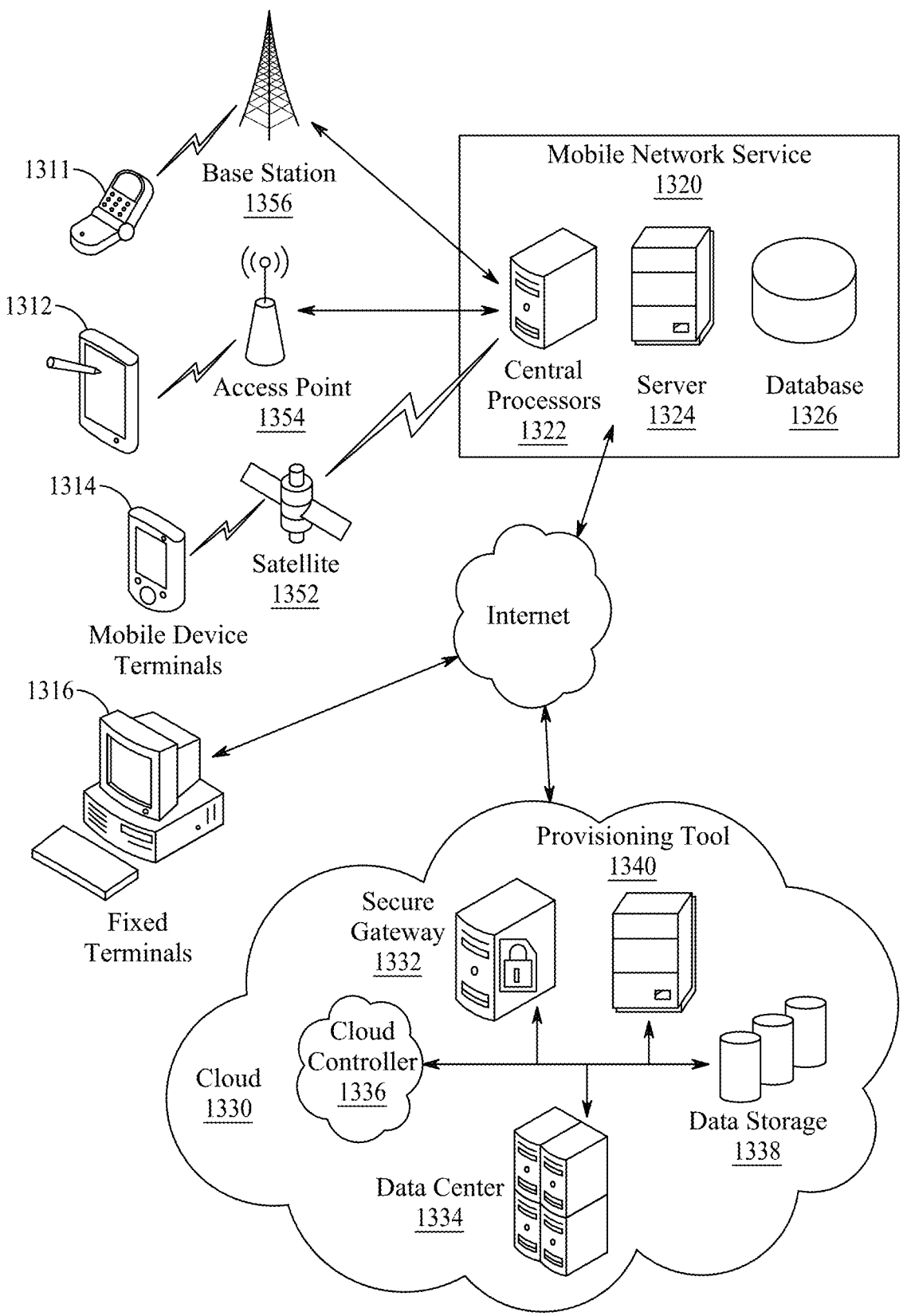
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for fractional order dynamic inversion control, comprising:
  receiving a mathematical model of a controlled device, the mathematical model including a set of movement trajectories, wherein the movement trajectories include control objectives;
  formulating a first set of linear, time-varying, fractional order differential equations from the mathematical model, the first set including dynamic constraints on the control objectives;
  transforming the first set into linear equations by differentiating a norm measure function along the movement trajectories, thus generating a second set of fractional order differential equations;
  formulating the first set of linear, time-varying, fractional order differential equations based on:

$$\frac{d^\alpha}{dt^\alpha}\xi + c(t)\xi = 0,$$

where $0 < \alpha \le 1$ and $$\frac{d^\alpha \xi}{dt^\alpha} = 2ne\left(F(x) + G(x)u - \frac{d^\alpha}{dt^\alpha} y_{meas}\right),$$

where $\xi$ is an error function, $c(t)$ is a constraint at time t, n is a positive real valued constant, e is an error in a position of the controlled device, $F(x)$ is a force applied to move the controlled device along the movement trajectories, $G(x)$ is a frictional force, u is an input vector, $\alpha$ is a fractional order of a derivative $$\frac{d^\alpha}{dt^\alpha},$$

and $y_{meas}$ is an output vector;
  wherein $u_c$ is the dynamic constraints on the control objectives of a linear servo cart given by:

$$u_c = G^+\left(F(x) + c(t)e - \frac{d^\alpha}{dt^\alpha} y_{meas}\right),$$

where G+ is a real part of the frictional force;
  determining a control signal for controlling the movement trajectories in the presence of disturbances by dynamically inverting the second set of fractional order differential equations; and
  controlling the movement trajectories of the cart with the control signal.

2. The method of claim 1, further comprising:
  inverting the second set of fractional order differential equations by applying a Moore-Penrose generalized inverse (MPGI) transformation.

3. The method of claim 2, further comprising:
  applying a dynamic scaling factor to the MPGI transformation.

4. The method of claim 3, wherein the dynamic scaling factor, $\dot{u}(t)$, is given by:

$$\dot{u}(t) = -u(t) + \frac{\gamma}{\|e_{x_c}(t)\|^2 + \|e_{x_c}(t)\|^2}, u(0) > 0,$$

where $e_{x_c}(t)$ is an error in the position of the cart at time t and y is a positive real-valued constant.

5. The method of claim 1, wherein the cart is actuated by a motor to move along movement trajectories dynamically constrained to a track, and the mathematical model is given by $x(t) = F(x) + g(x)u$; $y(t) = h(x)$, where $x(t)$ is a position vector of the cart, $y(t)$ is an output vector, $g(x)$ is a frictional force, u is a control input vector, and $F(x)$ is a motor force.

6. The method of claim 5, further comprising:
  calculating an error function for a position of the cart based on $\xi_{x_c} = n_1 e_{x_c}^2(t)$, where $e_{x_c}^2(t) = (x_c - x_{cd})^2$, and where $e_{x_c}^2(t)$ is an error in the position of the cart at time t, $n_1$ is a first positive real valued constant, $x_c(t)$ is an actual position of the cart at a time t and $x_{cd}(t)$ is a desired position of the cart at the time t.

7. The method of claim 6, further comprising:
  calculating an error function for a linear velocity of the cart based on $\xi_{v_c} = n_2 e_{v_c}^2$, where $e_{v_c}^2 = (v_c - v_{cd})^2$, $e_{v_c}^2$ is an error in the linear velocity at time t, $n_2$ is a second positive real valued constant, $v_c(t)$ is an actual linear velocity of the cart at a time t, $v_{cd}(t)$ is a desired linear velocity of the cart at the time t.

8. The method of claim 7, further comprising:
  generating the first set of linear, time-varying, fractional order differential equations based on:

$$M\dot{v}_c(t) + F_{aj}(t) = F_c(t) - B_{eq}v_c(t),$$

where M is a mass of the cart, $v_c(t)$ is a linear velocity of the cart, $F_c(t)$ is the force applied to the cart and $B_{eq}$ is an equivalent viscous damping coefficient, wherein $F_{aj}$ is an armature inertial force due to motor rotation acting on the cart defined as:

$$F_{aj} = \frac{\eta_g K_g \tau_{aj}}{r_{mp}},$$

where $\eta_g$ is a gear box efficiency, $K_g$ is a gear ratio, $\tau_{aj}$ is an inertial torque of the armature, $r_{mp}$ is a radius of the motor pinion.

9. The method of claim 8, wherein:
$\tau_{aj}$ is given by:

$$\tau_{aj} = J_m \dot{\omega}_m(t), \text{ and}$$

$v_c(t)$ is given by:

$$v_c(t) = \frac{r_{mp} \omega_m(t)}{K_g},$$

where $\omega_m(t)$ is an angular momentum of a motor shaft of the motor and $J_m$ is a constant which represents a moment of inertial of a rotor of the motor.

10. The method of claim 9, further comprising:
generating the second set of linear, time-varying, fractional order differential equations based on:

$$\frac{d^\beta}{dt^\beta}\xi_{x_c} + C_1(t)\frac{d^\alpha}{dt^\alpha}\xi_{x_c} + C_2(t)\xi_{x_c} = 0,$$

$$\frac{d^\alpha}{dt^\alpha}\xi_{v_c} + C_3(t)\xi_{v_c} = 0,$$

where $C_1$, $C_2$, and $C_3$ are coefficients; $\alpha$ is a fractional order of a derivative $$\frac{d^\alpha}{dt^\alpha},$$

for $0<\alpha\leq 1$ and $\beta$ is a fractional order of $$\frac{d^\beta}{dt^\beta},$$

for $0<\beta\leq 1$, $\xi_{x_c}$ is an error function of the position of the cart, and $\xi_{v_c}$ is an error function of a linear velocity of the cart.

11. The method of claim 10, further comprising:
selecting the $C_1$, $C_2$, and $C_3$ such that the second set achieves asymptotic stability.

12. The method of claim 11, further comprising:
inverting the second set of fractional order differential equations by applying a Moore-Penrose generalized inverse (MPGI) transformation.

13. The method of claim 12, further comprising:
applying a dynamic scaling factor to the MPGI transformation.

14. The method of claim 13, wherein the dynamic scaling factor, $\dot{u}(t)$, is given by:

$$\dot{u}(t) = -u(t) + \frac{\gamma}{\|e_{x_c}(t)\|^2 + \|e_{v_c}(t)\|^2}, u(0) > 0,$$

where $e_{x_c}(t)$ is an error in the position of the cart at time t, $e_{v_c}(t)$ is an error in the linear velocity of the cart at time t and $\gamma$ is a positive real-valued constant.

15. A system for fractional order dynamic inversion control of a controlled device, comprising:
a controlled device configured to move along a set of movement trajectories based on control objectives;
a motor configured to generate a force which moves the controlled device along the movement trajectories;
a computing device connected to the motor, the computing device having circuitry and program instructions, which when executed by at least one processor, are configured to:
receive a mathematical model of the controlled device, the mathematical model including the set of movement trajectories, wherein the set of movement trajectories include the control objectives;
formulate a first set of linear, time-varying, fractional order differential equations from the mathematical model, the first set including dynamic constraints on the control objectives;
transform the first set into linear equations by differentiating a norm measure function along the movement trajectories, thus generating a second set of fractional order differential equations;
formulate the first set of linear, time-varying, fractional order differential equations based on:

$$\frac{d^\alpha}{dt^\alpha}\xi + c(t)\xi = 0,$$

where $0<\alpha\leq 1$ and $$\frac{d^\alpha \xi}{dt^\alpha} = 2ne\left(F(x) + G(x)u - \frac{d^\alpha}{dt^\alpha}y_{meas}\right),$$

where $\xi$ is an error function, $c(t)$ is a constraint at time t, n is a positive real valued constant, e is an error in a position of the controlled device, $F(x)$ is a force applied to move the controlled device along the movement trajectories, $G(x)$ is a frictional force, u is an input vector, $\alpha$ is a fractional order of a derivative $$\frac{d^\alpha}{dt^\alpha},$$

and $y_{meas}$ is an output vector;
wherein $u_c$ is the dynamic constraints on the control objectives of a linear servo cart given by:

$$u_c = G^+\left(F(x) + c(t)e - \frac{d^\alpha}{dt^\alpha}y_{meas}\right),$$

where G+ is a real part of the frictional force; and
determine a control signal for controlling the movement trajectories in the presence of disturbances by dynamically inverting the second set of fractional order differential equations.

16. The system of claim 15, wherein the computing device is further configured to:
- invert the second set of fractional order differential equations by applying a Moore-Penrose generalized inverse (MPGI) transformation;
- apply a dynamic scaling factor to the MPGI transformation, wherein the dynamic scaling factor, $\dot{u}(t)$, is given by:

$$\dot{u}(t) = -u(t) + \frac{\gamma}{\|e_{x_c}(t)\|^2 + \|e_{v_c}(t)\|^2}, u(0) > 0,$$

where $e_{x_c}(t)$ is an error in the position of the cart at time t and $\gamma$ is a positive real-valued constant.

17. The system of claim 15, wherein:
- the mathematical model is given by $\dot{x}(t) = F(x) + g(x)u$; $y(t) = h(x)$, where $x(t)$ is a position vector of the cart, $y(t)$ is an output vector, $g(x)$ is a frictional force, u is a control input vector, and $F(x)$ is a motor force;
- wherein the computing device is further configured to:
  - calculate an error function for a position of the cart based on $\xi_{x_c} = n_1 e_{x_c}^2(t)$, where $e_{x_c}^2(t) = (x_c - x_{cd})^2$, and where $e_{x_c}^2(t)$ is an error in the position of the cart at time t, $n_1$ is a first positive real valued constant, $x_c(t)$ is an actual position of the cart at a time t and $x_{cd}(t)$ is a desired position of the cart at the time t;
  - calculate an error function for a linear velocity of the cart based on $\xi_{v_c} = n_2 e_{v_c}^2$; where $e_{v_c}^2 = (v_c - v_{cd})^2$, $e_{v_c}^2$ is an error in the linear velocity at time t, $n_2$ is a second positive real valued constant, $v_c(t)$ is an actual linear velocity of the cart at a time t, $v_{cd}(t)$ is a desired linear velocity of the cart at the time t;
  - generate the first set of linear, time-varying, fractional order differential equations based on:

$$M\dot{v}_c(t) + F_{aj}(t) = F_c(t) - B_{eq}v_c(t),$$

where M is a mass of the cart, $v_c(t)$ is a linear velocity of the cart, $F_c(t)$ is the force applied to the cart and $B_{eq}$ is an equivalent viscous damping coefficient, wherein $F_{aj}$ is an armature inertial force due to motor rotation acting on the cart defined as:

$$F_{aj} = \frac{\eta_g K_g \tau_{aj}}{r_{mp}},$$

where $n_g$ is a gear box efficiency, $K_g$ is a gear ratio, $\tau_{aj}$ is an inertial torque of the armature, $r_{mp}$ is a radius of the motor pinion;
wherein:
$\tau_{aj}$ is given by:

$$\tau_{aj} = J_m \dot{\omega}_m(t), \text{ and}$$

$v_c(t)$ is given by:

$$v_c(t) = \frac{r_{mp}\omega_m(t)}{K_g},$$

where $\omega_m(t)$ is an angular momentum of a motor shaft of the motor and $J_m$ is a constant which represents a moment of inertial of a rotor of the motor;
generate the second set of linear, time-varying, fractional order differential equations based on:

$$\frac{d^\beta}{dt^\beta}\xi_{x_c} + C_1(t)\frac{d^\alpha}{dt^\alpha}\xi_{x_c} + C_2(t)\xi_{x_c} = 0,$$

$$\frac{d^\alpha}{dt^\alpha}\xi_{v_c} + C_3(t)\xi_{v_c} = 0$$

where $C_1$, $C_2$, and $C_3$ are coefficients; $\alpha$ is a fractional order of a derivative $$\frac{d^\alpha}{dt^\alpha},$$

for $0 < \alpha \le 1$ and $\beta$ is a fractional order of $$\frac{d^\beta}{dt^\beta},$$

for $0 < \beta \le 1$, $\xi_{x_c}$ is an error function of the position of the cart, and $\xi_{v_c}$ is an error function of a linear velocity of the cart;
- select the $C_1$, $C_2$, and $C_3$ such that the second set achieves asymptotic stability;
- invert the second set of fractional order differential equations by applying a Moore-Penrose generalized inverse (MPGI) transformation; and
- apply a dynamic scaling factor to the MPGI transformation, wherein the dynamic scaling factor, $\dot{u}(t)$, is given by:

$$\dot{u}(t) = -u(t) + \frac{\gamma}{\|e_{x_c}(t)\|^2 + \|e_{v_c}(t)\|^2}, u(0) > 0,$$

where $e_{x_c}(t)$ is an error in the position of the cart at time t and $\gamma$ is a positive real-valued constant.

18. A non-transitory computer readable medium having program instructions stored therein that, when executed by one or more processors, cause the one or more processors to perform a method for fractional order dynamic inversion control, comprising:
- receiving a mathematical model of a controlled device, the mathematical model including a set of movement trajectories, wherein the movement trajectories include control objectives;
- formulating a first set of linear, time-varying, fractional order differential equations from the mathematical model, the first set including dynamic constraints on the control objectives;
- transforming the first set into linear equations by differentiating a norm measure function along the movement trajectories, thus generating a second set of fractional order differential equations;
- formulating the first set of linear, time-varying, fractional order differential equations based on:

$$\frac{d^\alpha}{dt^\alpha}\xi + c(t)\xi = 0,$$

where $0 < \alpha \leq 1$ and $$\frac{d^\alpha \xi}{dt^\alpha} = 2ne\left(F(x) + G(x)u - \frac{d^\alpha}{dt^\alpha} y_{meas}\right),$$

where $\xi$ is an error function, c(t) is a constraint at time t, n is a positive real valued constant, e is an error in a position of the controlled device, F(x) is a force applied to move the controlled device along the movement trajectories, G(x) is a frictional force, u is an input vector, $\alpha$ is a fractional order of a derivative $$\frac{d^\alpha}{dt^\alpha},$$

and $y_{meas}$ is an output vector;
wherein $u_c$ is the dynamic constraints on the control objectives of a linear servo cart given by:

$$u_c = G^+\left(F(x) + c(t)e - \frac{d^\alpha}{dt^\alpha} y_{meas}\right),$$

where G+ is a real part of the frictional force; and determining a control signal for controlling the movement trajectories in the presence of disturbances by dynamically inverting the second set of fractional order differential equations;

controlling the movement trajectories of the cart with the control signal.

19. The computer readable medium method of claim 18, further comprising:

inverting the second set of fractional order differential equations by applying a Moore-Penrose generalized inverse (MPGI) transformation; and applying a dynamic scaling factor to the MPGI transformation, wherein the dynamic scaling factor, $\dot{u}(t)$, is given by:

$$\dot{u}(t) = -u(t) + \frac{\gamma}{\|e_{x_c}(t)\|^2 + \|e_{v_c}(t)\|^2}, u(0) > 0,$$

where $e_{x_c}(t)$ is an error in the position of the cart at time t, $e_{v_c}(t)$ is an error in the linear velocity of the cart at time t and $\gamma$ is a positive real-valued constant.

* * * * *